United States Patent [19]

Korsinsky

[11] Patent Number: 4,736,447

[45] Date of Patent: Apr. 5, 1988

[54] VIDEO COMPUTER

[76] Inventor: Gersh Korsinsky, 1236 49 St., Apt. #4B, Brooklyn, N.Y. 11219

[21] Appl. No.: 769,476

[22] Filed: Aug. 26, 1985

Related U.S. Application Data

[63] Continuation-in-part of Ser. No. 473,124, Mar. 7, 1983, abandoned.

[51] Int. Cl.⁴ .............................................. G06K 9/00
[52] U.S. Cl. ..................................................... 382/69
[58] Field of Search ............................ 381/36, 42, 43; 84/1.01; 364/200, 900, 513.5; 358/903; 382/1, 9, 10, 34, 41, 57, 58, 69

[56] References Cited

U.S. PATENT DOCUMENTS

| | | | |
|---|---|---|---|
| 4,000,510 | 12/1976 | Cheney et al. | 358/903 |
| 4,041,467 | 8/1977 | Cota et al. | 364/900 |
| 4,136,395 | 1/1979 | Kolpek et al. | 382/57 |
| 4,215,343 | 7/1980 | Ejiri et al. | 84/1.01 |
| 4,295,121 | 10/1981 | Enser et al. | 382/9 |
| 4,430,726 | 2/1984 | Kasday | 364/900 |

Primary Examiner—Leo H. Boudreau
Assistant Examiner—Jose L. Couso

[57] ABSTRACT

A video computer system which can comprehend data for automatic data-processing operations and more specifically for automatic identification of data obtained by input devices, the system being suitable for automatic data-processing operations and applications.

1 Claim, 18 Drawing Sheets

3. The present invention discloses a principle of:
    (a) Pattern display as a result from loading files by music performance entering.
    (b) Music performance as a result from loading files by pattern entering.
4. The patterns shape design is independent of the note performance and can be any design.

The present invention is distinguishable from Ejiri et al by specific embodiment of the principle and operational mode.

Kolpek et al., U.S. Pat. No. 4,136,395, Jan. 23, 1979, System For Automatically Proofreading a Document.
1. Kolpek et al. discloses a system for correction of typographical errors from use of an electrical typewriter.
2. Kolpek et al. system provides a part of the typewriter for control and operation of the print head and servodevices of the typewriter, for error correction purposes.
3. The errors result from incorrectly keyed entrances of the keyboard.
4. The dictionary memory contains a limited capacity of words.
5. The system is not served by the computer and therefore is very limited in its operation.
6. The errors are corrected by the operator.

The present invention is distinguishable from Kolpek et al by a specific embodiment of the principle and operation mode as follows:
1. The errors result from incorrect recognition of the handwrittern or dictated printed word images.
2. Each word is recognized from handwriting or dictation compared against the contents of an unabridged dictionary for accurate recognition.
3. The recognition creates a file of possible identification for each letter or word in order to degree of possibility.
4. If the comparison of the letter of the word is replaced by the next possible letter for the next comparison cycle
5. The comparison and replacement cycle loops continues repetitiously until the comparison is equal or the end of letter replacement occurs.
6. If the comparison is unequal the word and its location on the page are stored for future computer actions.
7. The future possible computer actions are:
    (a) comparison of the handwritten or typed images of the word to the other, previously recognized as correct by the loop repetitions, words.
    (b) the operator assistance
    (c) recognition by logical, graphical or spelling rules of computer programs.

Enser et al., U.S. Pat. No. 4,295,121, Oct. 13, 1981, Device for Optical Character Reading.
1. Enser et al discloses a device for optical character reading.
2. The device is comprises an assembled from electronics parts a simple integrated circle for analog to digital converting a signal from the optical device by computer control for recognizing simple numbers printed-like.
3. The circles digitized the signal without numbers or coordinate means, therefore the computer need calculate the bits in order to get a coordinate value means for recognition purposes.
4. Enser et al discloses a recognition process is low speed and not significant for fast video signal processing.

VIDEO COMPUTER

This is a continuation-in-part application based on patent application Ser. No. 473,124, filed Mar. 7, 1983, now abandoned.

TECHNICAL FIELD

The present invention relates to a video computer which can comprehend data for automatic data-processing operations and more specifically for automatic identification of data read by a sensitive device video camera, microphone, etc) suitable for automatic data-processing operations and applications.

A video computer can operationally be divided into three main parts:

The first one—comprises a reader for reading the data to automatically code into the computer.

The second one—comprises an automatic recognizer for recognizing the data for identification.

The third one—comprises a part for data-processing operations and applications.

Kasday, U.S. Pat. No. 4,430,726, Feb. 7, 1984, Dictation/Transcription Method and Arrangement.
1. Kasday discloses the principle of identification of dictated and transcribed data addresses by a signal generated as a result of a button being pressed.
2. According to Kasday's disclosure the dictators voice or his words cannot be recognized by the machine.

The dictation division (FIG. 5, claims 1 and 5) of the present invention recognizes the real dictators voice and his verbal dictation, then translates each letter to the value of its corresponding letter (key) on the key board.

Cheney et al, U. S. Pat. No. 4,000,510, Dec. 28, 1976, System for Storage and Retrieval of Video Information on a Cyclical Storage Device.
1. Cheney et el. discloses a principle of indirect control of addresses residing in the video tape recorder by assigned code.
2. The system compares the entered number with all the addresses on disc the system retrieves a picture of the personnel by a match between the entered number and the addresses on the disc. The picture resides in the file of the entered address and may be used as a method of storage
3. The system does not provide an analog to digital, or vise versa conversions of the data and therefore cannot handle digital-analog combinations for the use of drive operations.
4. The combined analog and digital drive of the present invention provides a method of fast multiple converting and switching of the data or commands from analog to digital, or vice versa, which allows a form of a combined analog and digital state suitable for drive operations.

The drive operates on an input/output signal form consisting of analog, digital or a combination.

The combined analog and digital drive is distinguishable from from the Cheney et el. by specific embodiment of the principle and operational mode.

Ejiri et al., U.S. Pat. No. 4,215,343, July 29, 1980, Digital Pattern Display System.
1. Ejiri et al discloses a principle of pattern generator of the music notes for display.
2. The pattern shape is a function from the frequency of the notes and therefore the display quality is dependent on the electrical circles.

The present invention includes a signal processing which is an analog computer which operates of state such as electrical magnitudes. The signal processor generates a data for data processing by a standard computer.

The signal processor build form analog computer devices and very large scale integrated circuits (chips) for A/D and D/A convertors.

The simple operations similarly to Enser et al discloses can be provided by the present invention by simple definition of the set of points or numbers or by data written over the recognition standard for matching by analog or digital circles.

A drawback for the above enumerated known devices is that they tend to be limited in the features for automatically identifying the data for performing the applications.

However the above enumerated known devices will not solve the problems of a computer for automatic data-processing operations and applications.

The object of this invention is to provide a computer which can automatically read, code, recognize and identify data, and perform the following applications (examples):
1. Automatic comprehension of human language (typed, handwritten, dictated);
2. Automatic typing of handwritten script text;
3. Automatic type from dictated text;
4. Automatic reciting of the handwritten or typed text;
5. Automatic typing of music notes from instrumental performing;
6. Automatic music performed by computer reading the typed music notes;
7. Automatic making of drawings from models, existing drawings, etc;
8. Automatic identifications of pictures, views, voices, objects (moveable or immovable), human, etc;
9. Automatic reading of graphics, drawings, etc;
10. Automatic translation of computer keys to any image values;
11. Automatic creation and storing of rules (analog or digital form);
12. Automatic identification and selection by the video camera of a particular object (car), human, television screen, etc;
13. Automatic computer operating by dictated or typed (handwritten) test of instructions, programs and statements, etc;
15. Automatic measuring of the physical data;
16. Automatic preparing of analog pattern of drawings or standard image (circles, symbols of scheme, curbs, etc);
17. Automatic comprehension of reading and selecting letters, articles, books, etc.

Another object of this invention to achieve by means of a computer the automatic data-processing and applications comprised of a number of independently operational divisions including a file of standards of the data, a hardware and software unit for identifying data and data-processing operations.

The invention also provides a computer for creating definition flags by data reading:
1. Flags from physical values of data: color (chromo), black levels moving differences, size, dimensions, absolute and relative coordinates, sets or real numbers of points, specific (parts, text, mark, etc), width and shade values, crossing lines and points, etc, time values of the points, functions, graphic and mathematical values of the data, etc
2. Flags created by transferring into analog functional devices:
   a. Modulating and demodulating by flags (increase, decrease, reverse, etc), separating the signal by color (chromo), black levels values, etc, compressing the line and black levels width to one pulse value and the shades to one outline value, graphical, functional and mathematical expression of the data, logical manipulating, etc.
   b. Scanning manipulation of the sensitive device:
   Lock and follow (fixed time), follow (pattern), flying, into programs, mathematics and function expressions, pattern, scanning by reading data, etc;
   c. converting the analog values to digital and vice versa;
3. Creating flags from curser and sensitive device scanning by data reading:
   a. Reading lines, circles, ellipsices, etc. (line reading only);
   b. Moving flags (up, down, left, right, reverse, etc.);
4. Creating flags from mathematic and graphical calculations, logical manipulating, physical measuring, function and sets of real numbers of points definition, etc.;
5. Definifition by overlap reading and writing data into memory:
   a. analog primary (secondary) storage and converting to digital equivalent as needed;
   b. Analog low speed primary and secondary storage (magnetic and video discs, etc.);
   c. Buffer analog virtual memory for one frame capacity (television screen-like) by scanning read and write memory;

Another object of this invention is to provide a computer for identifying data by a code, which is real data or converted into devices to real values (functions, flags, mathematics expressions, etc.) in different to the existing computer codes, which is any abstract number value.

Yet is another object of this invention is to provide a computer for automatic coding of data read by a sensitive device (video camera, microphone, etc.) and operate by analog function devices for getting some definition flags which will be converted to digital form for binary controlling of the analog devices and processes.

The data can be any type:
   a. Individual and variable (from handwritten lettering, from dictated words, letters, etc., voices, etc.); varies widely (functions received from a device, etc.); individual (printed alphabet, instrumental performing, etc.); other (pictures, drawings, etc.);
   b. Video Image: word text (handwritten lettering, typed, etc.), lines (graphics, drawings, etc), points (pictures, view, objects, etc.), color (chromo), objects (movable or immovable, from surface, video view, or television screen, etc.);
   c. Audio Data: dictated text (words, letters, pausing, etc), instrumental music performing and note typing, voices, etc.

The invention performs these mentioned tasks by means of a video computer comprised of a number of independently operated blocks and divisions, including:
   a. A programmable sensitive device (video camera, microphone, etc) which reads the data;
   b. A subsystem, which performs computer interfacing and analog and digital complementary functions;

c. A combined analog and digital drive, which performs combined analog and binary computer drive operations;

d. A number of application divisions, which recognizes and identifies data for application needs;

e. Output devices which perform the output applications;

f. Computer, which connected to all blocks and divisions and which binary complementary control of all devices, block, and divisions by applying supporting hardware and software for data-processing operations and applications;

The invention will also provide a computer for automatic recognition of data by creating files of standards. The files will be created equalizing the definition values of the data [flags, marks, definition techniques (electronics, video, analog, logical, computing, mathematics, graphics, etc.)] to some computer key values for a standard of the data definition.

The recognition files of the data can classified:

a. A file of the real data image (text, picture, graphics, etc);

b. A file of a particular part of the data presented as typical of the whole data (human part, view, etc.);

c. A file of functions, mathematic expressions, graphics, calculational and logical manipulating, etc from converting the data to them;

d. An individual file of the function of the handwritten lettering (words, symbols, letters, etc.) from each individual for primary recognition standard and spelling techniques for accuracy;

e. An individual file from the dictated words (letters, pauses, signs, etc). from each individual for primary recognized standard and spelling techniques for accurate recognition;

f. A file of each musical instrument performance of each note;

g. A file of any type of alphabets;

h. Etc.

An intent of this invention will be to provide a computer for reading and understanding the human language and identifying the main ideas, subjects and all other details, which make up any literature.

The questionnaire directory (similar to the questions of the parts of sentence) is suitable for calling the main line and all other details for describing the main ideas and subjects by order degree of importance or by particular questions, the questionnaire will be created by comparing the data text to a dictionary, which contains all defintion flags of the words suitable for computer identification related degree of coherence within each word and sentence for creating lines into an order of degree of important ideas and subjects for definition of main ideas and subjects.

Another intent of this invention will be to provide a computer, which each of the device, divisions and units is programmable and performs the local operations (between unit, division, device, etc.) independently and simultaneously and the computer will performs the control of all devices, divisions, units, etc. and complicated operations only.

The foregoing and other objects, features and advantages of the invention will be apparent from the following description of a preferred embodiment of the invention, as illustrated in the accompanying drawings.

SUMMARY OF THE INVENTION

The present invention is directed to a computerized initiated process of a sensory perception and comprehension of a human language, and information converted so that it can be communicated to the user in an intelligible form is output.

General application of the present invention is a computer for (visual or audio) word and graphic reading and processing.

The invention related to a video computer for a data processing of the information read by a sensor or electrical device and data converted to a video signal representation.

Particularly, the invention relates to a combined analog and digital computer for analog signal processing and digital data processing.

Specifically, the present invention is an analog electrical signal processor for generating a definition signal, which represented the information read by a sensor or electrical device, for a digital computer data processing.

More specifically, the conversion of data to information follows the pattern: Input involves reading by a sensor or electrical device, converting to a video or to an audio signal representation, collecting, verifying, and coding data. Signal processing involves recognizing, identifying, converting to a computer numbers (keyboard key values), and storing; Data processing involves classifying, sorting, summarizing, and storing; information retrieved and converted so that it can be communicated to the user in an intelligible form is output.

Another approach to the invention is data collection and preparation for a source-data automation. Specifically, source-data automation is implemented by use of an electrical devices for reading data and converting it into machine language.

The common approaches to source-data automation follows the pattern:

Source document reading by sensor, collect data about an event, in electrical signal representation;

Signal processing for definition the represented information into combined analog and digital devices and methods;

Outline terminal operations;

Recognition of the signal representation and converting it to a information, in computer readable form, for computer data processing.

The invention provides an analog signal processor, which is analog computer in which numerical data are represented by analogous electrical signals.

The communication between the analog and digital processes is provides by analog to digital and digital to analog conversions.

The analog computer built from standard analog devices like very large scale integrators circuits(chips) interfaces and additional programmable multifunction analog microprocessors.

The analog computer includes:

(a) Analog central processing unit (CPU). The CPU with the digital computer and units support has an analog primary storage(memory) from the input devices for direct access capability. The CPU has an arithmetic logic unit (ALU). The central unit interpretates the instructions in storage and produces analog signals that act as commands to circuit to execute the instructions;

(b) The combined analog and digital drive provides auxiliary storage of data and access to the data;

(c) The computer has independent analog and digital input/output and interfaces to all units. The information presented simultaneous in digital and analog signal forms by mathematical equivalence;

(d) The data entry by the sensor and terminal signals which converts to analog forms;

(e) information output by analog devices from converting the digital signals to analog;

(f) Definition and separation of the video or an audio signals by analog devices (television/like or audio/like) and it digitized for primary storage into definition representation means;

(j) analog functional signal for instruction and commands, for read/write memory or sensor reading, multiple switching the I/O of the unit of devices, signal converting, comparing, computing, and etc. for example:

1. Simplifying addresses to local means by read/write memory into analog signal (functional shape) instructions;

2. Interfacing, communicating and I/O switching into analog functional signal.

The analog electronic signal can be generated from digital commands by D/A converting for analog instructions and commands. The analog signal can be digitized for digital instructions and commands.

The analog arithmetic and logical devices can provide complicate mathematic, graphic and function manipulating and computing. They provide the operation very fast and save time for CPU operations. The analog instructions and commands are a base for analog computer programming and analog data processing.

The object of the invention is a distributed system consistent devices connected by communication linkages to a full-sized computer (network).

The communication structure configuration allow transactions through computer before being routed to the appropriate network divisions for creating a central decision point.

The devices can be programmable by use of stored instructions and built into hardware (programmable read only memory (PROM)).

The division collect data at its source and transmit it to digital computer for data processing and to analog devices (subsystem) for signal processing.

The division increase the versatility and expend the applications of the computer. They are capable of very quickly and reliability performing complex functions and applications, since the operations are part of the actual computer circuity.

Each device (division, unit) satisfies distinct needs for input/output, which device is most appropriate for a certain applications depends on the particular I/O requirement.

The signal convertors contains I/O control units to increase the efficiency of the CPU by converting the input signal into machine code, vice versa and data buffering. The units control I/O operating and free CPU to do other processing; this allows input/output and processing to overlap. The units includes (depend from design) a selector for accommodate only one I/O device at a time or a multiplexor for accommodate multiple I/O devices.

It is object of the invention is source-data automation is implemented by use of a variety of methods.

Each requires special design of configurations system network for recognition of the signal represented information and conversion to a data for computer processing.

Therefore, the division designed for collected and stored data and other manipulating.

The functions are directed by programs stored in the devices primary storage units.

The divisions extends its applications into others areas as well. For example, a unit of division can be connected to other I/O devices and used as a stand-alone computer for low-volume or special purpose processing. Each instructions and data in storage has a simple unit address, particular item can be located by use of stored program instructions that give the addresses or to cursor scanning into electrical signal (signal instructions).

The units are devices that vacillate the execution of instructions. They act as temporary holding areas and are capable of receiving, holding it, and transferring it as directed by the instructions. The units includes a programmable communication processor which performs message-switching (receive messages and route them to appropriate destinations) functional pre-processing data before it transmitted to the computer, verifying successfully transmitted messages, holding communication with analog devices and signal conversion.

Source-data automation refers to collection of the data and the point where a transaction occurs. Common approaches to source-data automation employ:

(a) Electro-optical device is capable of reading visual image from a sheet or a surface;

(b) video camera is capable of reading visual image from views and objects in any color;

(c) microphone is employ to converting the oral or music image to electrical signal representation;

(d) Screen and keyboard are employ for operator computer manipulating;

(e) Speaker is employ for performing that comes from the computer as a result of processing the microphone input.

Still another object of the invention are acomplished by means a video computer comprising a sensor for reading data and converting to electronic signal representation, a signal processor by analog or by combined analog and digital devices for signal defining or digitizing it into machine language, a system of programmable devices (read only memory) and digital computer linked together in a system network configuration, which provides signal recognition process for generating information for a data processing (for a particular application), a full-sized digital computer in a network system configuration create a central decision point and computer powerful support to all systems and devices, a data entry by a standard computer keyboard and screen for operator manipulations, a combined analog and digital drive for access to data in auxiliary storage, a programmable primary storage able to locate the video signal in storage into data representation means, a speaker and standard computer output devices processes data that comes from the computer as a result of processing entering in a form human can read or hear.

It is a particular feature of the invention that the information is recognized by comparing the electronic signals represented the information and the recognition standard.

The recognition standard contain a signal that under specified conditions, service to define, represents, or records the magnitudes of information or a unit, functional constituent of whole information. The recognition standard signal is an awareness that signal representation has been perceived from manipulating, measuring or computing into analog or digital devices, discriminated reading/writing memory or into reading devices, or from mathematical manipulations.

The recognition standard contains a keyboard key values (numbers) equivalent, which are reversible (interconvertable) for computer loading or for user output.

The invention provides a video computer uses source-data automation for a variety particular application. The data read by a sensor and converted to a video or an audio signal representation.

Each application requires special methods for definition the enter signal, for recognition the data and for generating information for a data processing.

It is the examples, characterized the recognition methods:

(a) The handwritten script recognized by a recognition standard, which contains the moving characters (flags) by read/write scanning of the cursor or of the reading devices. The moving characters getting from cursor tracing and entering the lettering from the screen into keyboard operations, each letter characters equalized to keyboard key letter representation. Accuracy recognition by comparing the lettering to unbridged dictionary. The upper-left first point reading is a location coordinates for each letter;

(b) Printed or machine patterns or letter recognized by definition the set of points, the set of coordinates value numbers by mathematic computing or manipulating or by definition mathematic functions or expressions, or by read/write point matching. Each pattern or letter equalized to a keyboard key letter representations for an equivalent number;

(c) The dictated text or voices recognized by it comparing to samples of self dictated word or image (audio). Each dictated word equalized to keyboard key word equivalent for replacing;

(d) The music image from microphone recognized by comparing to recognition sample, stored into a keyboard key number of a particular note representation. The keyboard key number can be an equivalent of a pattern image of a particular note for visual display;

(e) The microphone entering image (audio) equalized to a keyboard key representation and can be stored into numbers or pattern means for speaker performances or visual display from keyboard manipulations. This can create audio output into programs;

(f) The recognition of the visible or the hidden lines of a model view as follow:
  a. The video camera looks perpendicularly toward one face of the model, he obtains a true view of the shape and the size of that side;
  b. The edge lines, contour lines and intersection lines will be get by revolve operating.
  c. The revolve operation can be displayed on the screen or automatic by programming the servo devices of the video camera revolving.
  d. The reading signals digitized for computing operations.

(g) Computer drawing operation includes:
  a. Reading the existing drawings and standards such as lettering, legends, symbolics, graphical image, etc. for creating files (dictionary) into numbers or names. The files can be used by keyboard/screen operations;
  b. Keyboard screen graphical operations includes changes scale and locations of the views and dimensions calculating, etc.;
  c. Drowing assemblage by screen overlapping views of the details and erasing or adding graphical corrections;
  d. Adding an existing graphical or text image;
  e. Draft reading by recognizing the detail views and it displays on the screen;
  f. Produces hard-copy output (paper or microfilm).

(h) Identification whole image or a portion (a character part) representative to all images by:
  a. Comparing the absolute and related coordinates values of the enter image to recognition standard image;
  b. Recognition the set of points or set of numbers of the enter image;
  c. Matching the enter image to recognition standard by overlapping read/write operations;

(l) Identification visual image by color reading into analog devices (television-like) and signal comparing or by digitizing the signal for computer matching operations;

(j) The video camera can create a visual measuring by systematically standardizing the graduation (calibrating) of video camera signal by reading standard of measurement units of color, length, area, black levels. The data can be measured by created measure standard;

(k). The differences images between first and the next fields reading is a recognition character for identification by a sensor reading;

(l). The recognition of object includes a system in a computer network system for selecting a recognition standard and a processor for identification.

It is a feature of the present invention to provide a computer for selection text information by recognizing words or symbolic.

For example:

1. Selecting letters by recognition the senders name or marks.

2. Selecting text information by recognizing particular words or sentences.

It is still another feature of the present invention to provide a computer capable of reading and output follow order of text generated from cross related, overlapped of communicated words in sentences diagramming system of related subjects for an order degree of importance information following.

It is a particular application of the present invention provides a computer for understandable reading of a human language. The computer sensor entered the text information into a machine language, each word received from the unabridged dictionary complete information by comparing the data words. The unabridged dictionary give a complete information of each word:
(a) Every definition in use;
(b) Specific aspects of the language, such as synonyms, antonyms, rhymes, and slangs;
(c) spelings, definitions, and matters of usage;
(d) All speech and sentence parts form of each word;
(e) Grammer, logic, usage, and mechanic of each word;
(f) Grammer and speech rules directing of the communications and diagramming of the sentences;
(g) The character for definition the communication between words in sentence for computer signaling;
(h) Relating and communicating network group words;

(i) All words placed or arranged in linguistics groups under which the group is closed and associated, and for which the group contains an identity element and an inverse for every element in the group. The group is an indicator for computer operation into lignuistics questions, which is a key or an instruction for computer operation.

The computer limits the dictionary by received number of data words only for simplifying and quick operating. The computer will analyze each sentence by using the information, received from the dictionary, in order to diagramming the words into sentence parts.

Each sentence diagram will be connected to the related sentence diagram for communication purposes. The words or diagramming parts link or overlap will create a compound diagram of related sentences for creating a complex of sentence diagram.

The frequency number and part of speech of the subjects in text can be criterion for order degree of importance of subjects.

The diagramming of lines can be as follow:

First line: each simple subjects and all verbs of the subjects from all sentences representation;

Second line: each simple subject, all verbs of the subjects and direct objects that received the action of the verbs from all sentences;

Third line: each simple subject, verb and direct object, (direct object as a simple subject), verb and next direct object. The diagramming continuation can be until the end of related to the main subject sentences for each compound verbs of the main subject;

Fourth line: is diagramming continuations of the third line for complete subject and predicate;

Fifth line: is diagramming continuation of the forth line for each compound verb and object, related to the main simple subject or independent subject;

Sixth line: is diagramming continuation of the fifth line for each relative to the main subject independent clauses (main clauses) in order: noun clause as subject, noun clause as a verb, noun clause as object of a proposition;

Next lines are diagramming continuation of the sixth line for each subordinate clauses or for each part of sentences which related to the main subject.

Each line follow the text displayed by a question for development the text follow.

The questionnaire contains a system of questions for each line, which are keys for directing follow the text or for interrupted switching the lines.

BRIEF DESCRIPTION OF THE DRAWINGS

The invention will now be described in connection with the following figures.

BEST MODE FOR CARRYING OUT THE INVENTION

Figure 1:
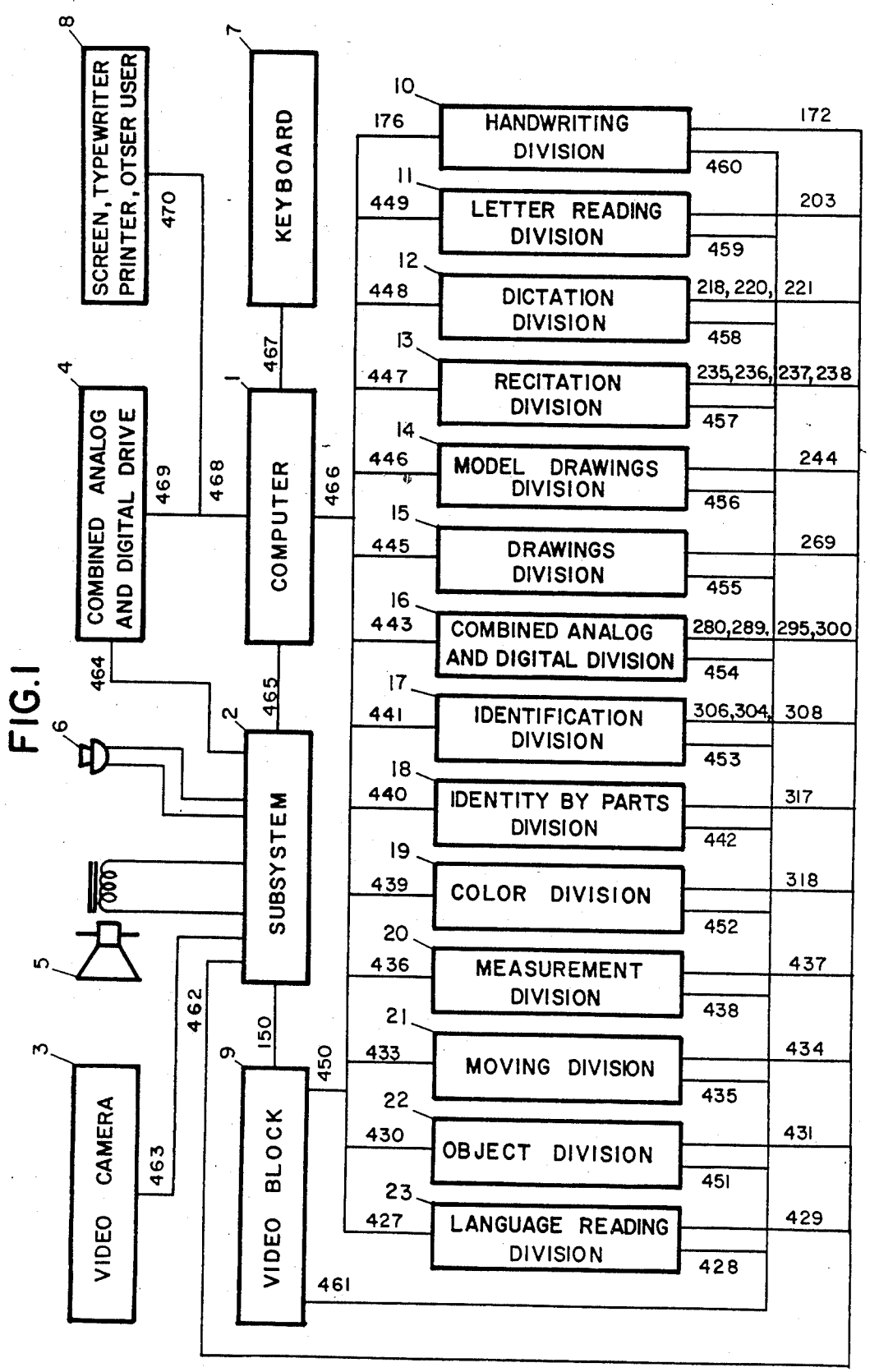
FIG. 1 discloses a block scheme of the video computer according to the present invention.

FIG. 1 discloses a block diagram of a video computer which combined two computer processes: a signal processing by combined analog and digital devices and a standard digital computer for data processing.

The signal processing recognize the signal representation of a physical data from electrical reading device.

The signal processing includes analog and digital processing for generating a data signal suitable for a data processing by a digital computer. The signal processing performed by analog device and digital circles by division and block sizes into digital computer support and control.

The computer maintenance order and control activity for directing the sequence of signal processing (from circles generated signals (commands)) and produces signals that act as commands to circuits to execute the signal processing.

The computer control the communication with input/output of the devices in order to transfer or to receive the signals into storage or to initiate the transfer or results from storage.

The division performs specific functions by simplifying operation code and operand from using electrical circuit signal instructions or from specific functional register in local CPU.

The unit perform the storage of the data signals and instructions into local simple addresses.

The signal processing is directed by functional signals. Therefore the control unit is able to locate each instruction or data in a functional located storage address.

Therefore read/write operations are according to the functional signal as an instruction.

The recognition standard contain the required instructions for a particular signal processing and placed into the unit memory by a unit simple address. When the signal representation will be recognized the physical data reading the signal will be replaced by a keyboard key representation of the data for digital computer processing.

The input/output of the devices are combined analog/digital in reversable electrically and by mathematics equivalent. The invention allows to provide by computer most function by analog devices.

For an example: meter circuits, filters, analog comparators, instrumental applications, signal generators, etc. The invention allow to write software in analog form similar to digital computer and added to digital computer and analog CPU. Therefore, by this computer can be designed (by written software) a large number of electronic system and allowed to test them. The advantages and features of the present invention will become apparent from the following examples.

It is to be understood, however, that the present invention is not limited to the followed examples, and may be utilized for a large number of computer applications.

Figure 2:
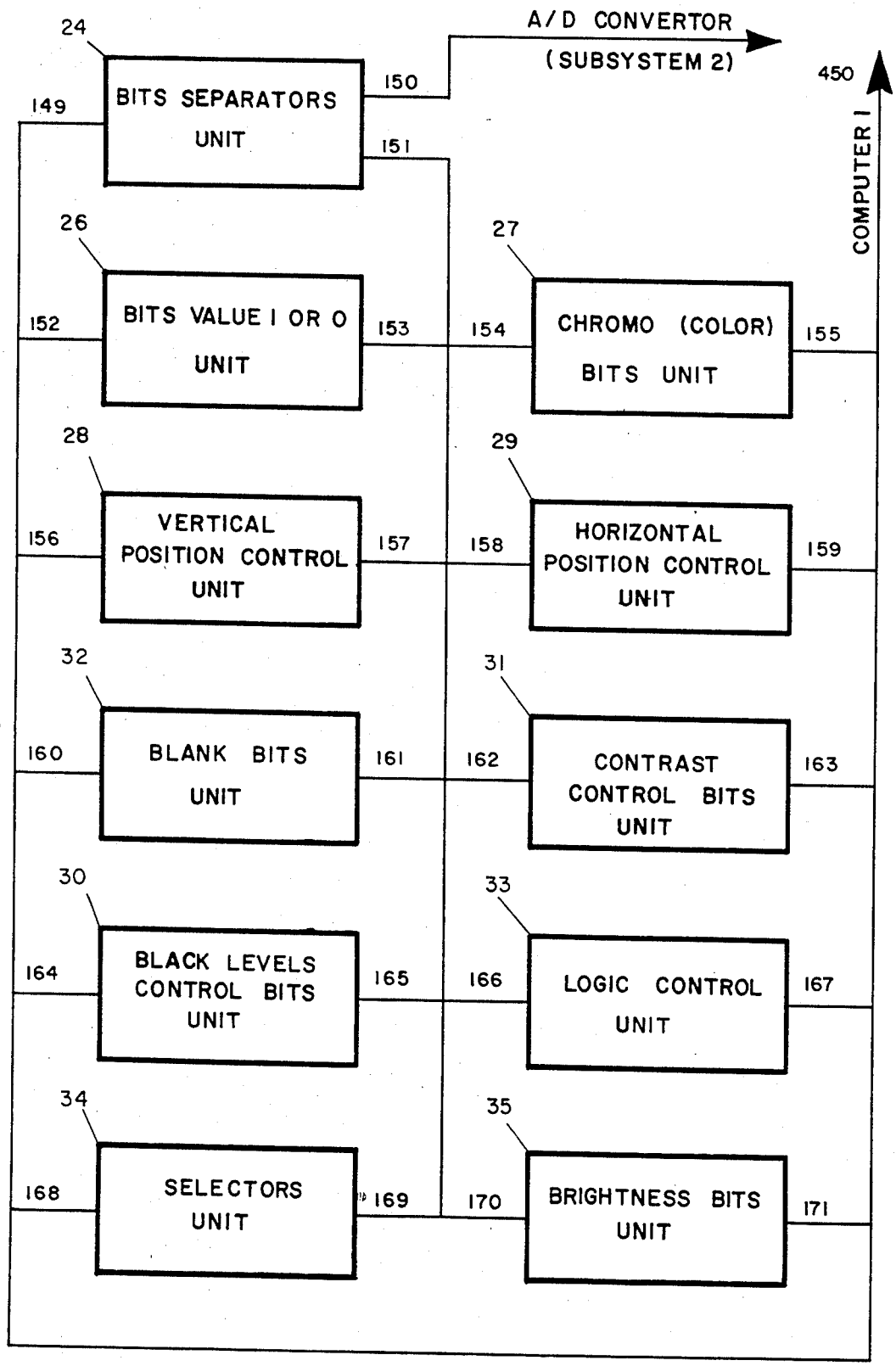
FIG. 2 discloses a block scheme of the video block according to FIG. 2.

FIG. 2 discloses a video block 9 FIG. 1 which is a programmable read only memory (PROM) that facilitate the execution of instruction by acting as temporary holding areas for instructions and data. The video block is a supplier of the bits of the definition parts of the video signals to the divisions.

The unit 24 will separate the signal and the unit 25, 26, 27, 28, 29, 30, 31, 32, 33 will assemble the data bits according to the definition parts of the video signal: by color means, by black level means, horizontal and vertical coordinate values means, frame scanning numbers, with compressor value 1 or 0 for each color means. The data representation address is according to the reading or writing methods. The data can be erased or overridden directly from the video device (after A/D converting) or by cursor read/write.

They can be held into commands or distributed between processors for a data a command search and stored for restoration the original color means or location coordinates means. The block can include own D/A convertor which will be an analog storage of the video signal and his definition parts. In another words the video block is a computerized, analog or digital storage of the data and instructions.

Now the subsystem 2 will be disclosed.

The particular construction of the subsystem 2 depends upon the varied needs of the this computer.

The subsystem is an analog computer with composed:
1. A combined control process:
   (a) Digital computer maintenance an order of control activities. The computer interprets the instructions of a program is storage and produces signals that act as commands to the analog circuits to execute the instructions. The communicating with analog input by D/A converting in order to transfer instructions and data and communicating with analog output devices to initiate the transfer of the result from and to storage by digitizing;
   (b) Analog control and communication between the analog devices by analog signals.
2. The arithmetic/logic unit or programmable multi functions includes a signal processor which performs analog comparisons, absorbence measurement data compressions, analog computer functions, transducer, linearization function, instrumentation calculation, vector function, algebraic computation, filters, phase detector, video signal switching and effect, voltage to frequency and frequency to voltage convertor, operational and instrumental amplifiers, and generators.
3. The primary storage (memory or main storage) is a combined:
   (a). Analog data and address digitized for digital storage or digital data D/A convertor for analog signal;
   (b). Analog circles delay for execute the analog instructions.
   (c). Functional signal generator, for an example: signal generator for beam scanning or for offset beam circuits.

The data representation is based on a binary system and electrical magnitudes value equivalent.

The subsystem 2 is analog microprocessor in another word is an analog computer which operate by analog state instructions from a signal D/A convertor of for magnitudes values such current, voltage, frequency and by digital state from digital computer or from A/D convertor signals.

The subsystem has independent analog and digital input/output and interfaces to all circuits.

The subsystem in combination with the digital computer and unit storage has an analog primary storage (memory) from input device for direct-access capability, which holds instruction, data and intermediate and final results.

The combined analog and digital drive provide auxiliary storage of data and access to the data. The analog memory allow to use any analog signals for instructions therefore allow programming by using analog commands and values. For an example will describe a principle of a drive discriminator for data reading by a letter shape.

The subsystem 2 can be designed like a monolith microprocessor with own low capability memory for functional inside operations or can be design similar to the analog computer CPU or can be design like a board or a block with busses for very large scale integrators circuits (chips) interfaces and additional programmable multifunction analog microprocessor.

The design depends on application use. For small home computers the subsystem is low cost and low functional the subsystem 2 can be programmed by analog machine language (analog signals).

The written programs will be translated to the analog machine language by D/A convertor which mathematically equivalent.

Figure 3:
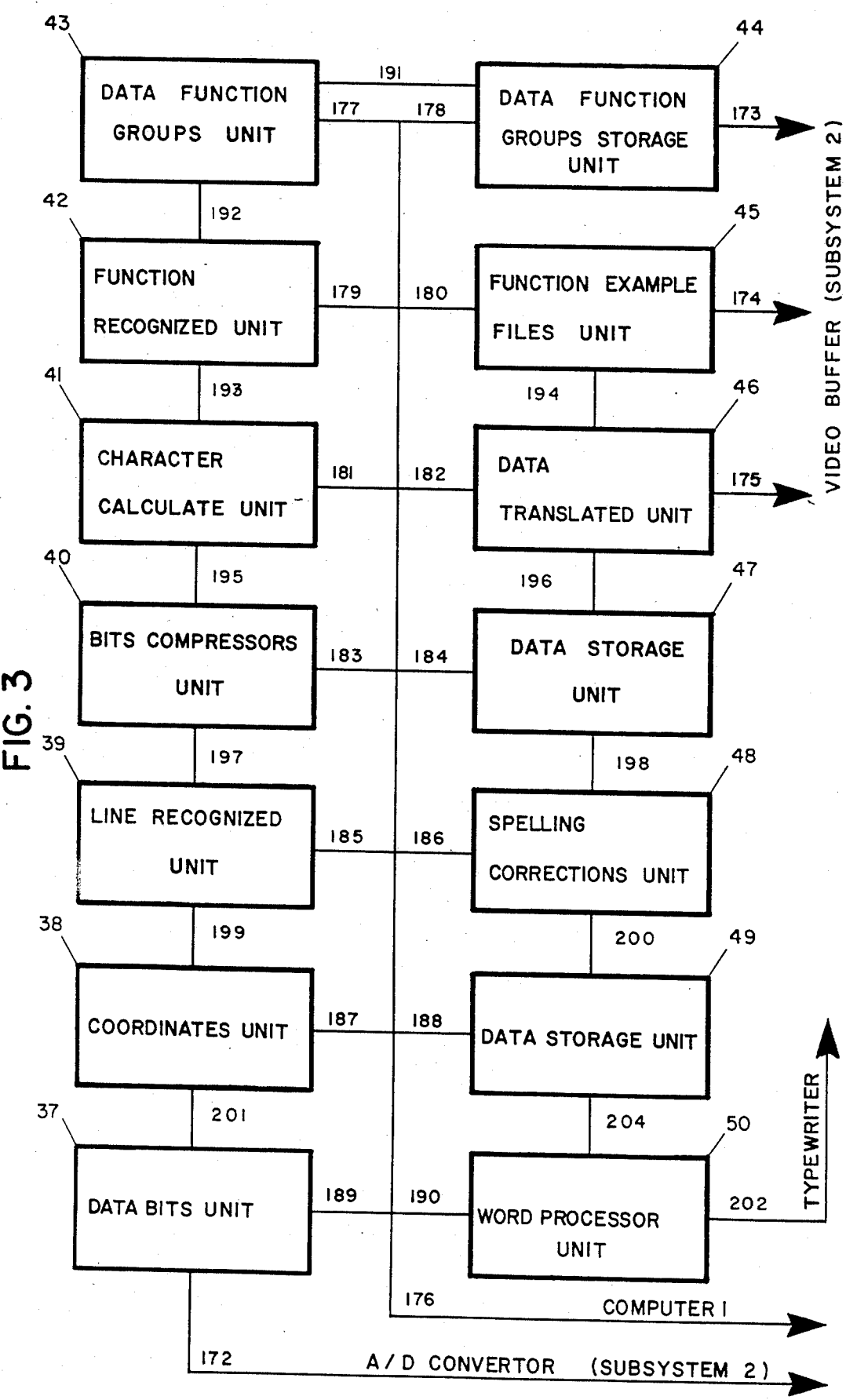
FIG. 3 discloses a block scheme of a handwritten division according to FIG. 1.

FIG. 3 discloses a handwriting division 10, (FIG. 1) for automatic typewriting from handwritten script.

The handwritten reading of the preferred embiodment of the the present invention will be described according to FIG. 3

Each handwritten letter or word will be read by the optical device 3, (FIG. 1) and will be converted to digital form by the system 2, (FIG. 1). The computer will display the image upon the screen 8, (FIG. 1)

The operator will enter cursor movements to trace the outer most lines of the letter or image existing of the screen. The movements will start from the upper left corner of the screen. The cursor movements of the letter will be equal to its corresponding letter value on the keyboard.

For an example: The handwritten letter "A" will retain the same value as the letter "A" residing on the keyboard.

The operator will repeat the above operations for each handritten letter, word or image and will serve as a personal dictionary for each individual.

DESCRIPTION OF THE PROCESS OF RECOGNITION

The recognition (standard) files will be loaded by the computer 1 and transferred to unit 45 FIG. 3 (of division 10) for storage. The data will be read by the video camera 3 FIG. 1 and will be converted to digital form in subsystem 2 and transferred to unit 24 FIG. 2, video block 9, FIG. 1.

The computer 1 will identify the bits and transfer then to the unit 26 or 27 (FIG. 2).

If the bits value 1 or 0 the computer 1 will interface the unit 26 (FIG. 2).

If the bits value is chromo(color) the computer 1 will transfer the data to the unit 98 (FIG. 12), division 19 (FIG. 1) for color identification.

The computer 1 will identify and the unit 99 will collect the data. The computer will separate the color data and the unit 100 will collect the color data.

The unit 101 (FIG. 12) will receive and store the data into color groups.

The computer 1 will select a color for reading and the data will transfer to unit 27 (FIG. 2) for storage.

The computer 1 will compress the bits to values 1 or 0 and will transfer to unit 26 (FIG. 2).

The computer 1 will interface with unit 37 (FIG. 3) of the division 10 to the unit 26 (FIG. 2).

The computer 1 will interface with unit 37 (FIG. 3) to the subsystem 2 (FIG. 1).

The video camera will repeat the frame scanning and the reading will be selective for color and bits value 1 or 0. The units 156 and 158 (FIG. 2) will store the vertical and horizontal positions.

The units 26, 27, 30, 32, 33, 35 (FIG. 2) will store the color or video control information for restoring video signal.

Now, the unit 37 will collect the data from the video camera by the bits value 1 or 0.

The unit 37 will collect the digitized first upper-left point from the video camera and the information will be transferred to computer 1.

The computer 1 will calculate the coordination of the point and unit 38 will store them for a letter location values.

Figure 9:
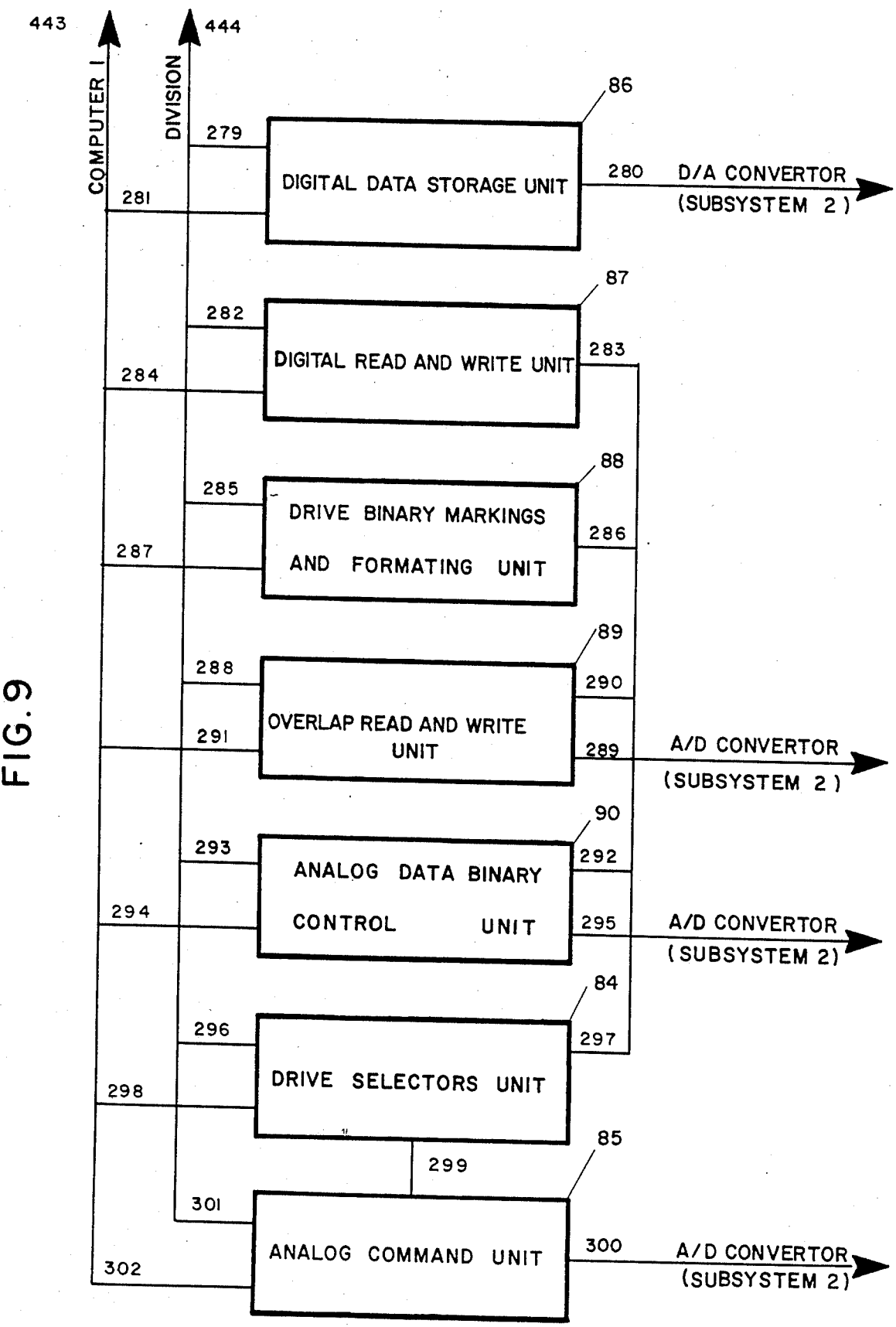
FIG. 9 discloses a block scheme of a combined analog and digital division according to FIG. 1.

The computer will interface with combined analog and digital drive 16. The unit 85 (FIG. 9) receive a signal command from The computer 1 and retransfer to unit 84 (FIG. 9).

The unit 84 (FIG. 9) will select and load a drive.

The unit 87 (FIG. 9) will receive the data from unit 45 (FIG. 3) for reading.

The unit 86 (FIG. 9) will collect the read data for digital to analog conversions by the D/A convertors in subsystem.

The computer 1 will interface with:

(a) scan circuits of the video camera 3.

(b) analog comparator circles to the D/A convertor for receiving the data from unit 86 (FIG. 9) in analog form.

(c) video camera and comparators outputs to the A/D convertors.

(d) scan circuits of the computer cursor to the unit 86 (FIG. 9).

(e) unit 90 (FIG. 9) to A/D.

The video camera will read and cursor will write the data by letter function scanning.

The analog comparators will compare the analog data received from the the video camera and from the unit 86 (analog form).

The data from the video camera and from the comparators will be converted to digital form for computer writing.

The data will be received by the unit 87 for storage.

The unit 90 will control the units 85, 86 and 87.

The computer 1 will transfer the data to unit 44 (FIG. 3).

The unit 44 (FIG. 3) will collect the data read by the video camera and compared by the analog comparators for each letter or word.

The computer will transfer the data to unit 43 by ignoring the the incompatible data.

The computer will compare the data received from unit 43 to data received from unit 45 (FIG. 3).

The computer 1 will recognize the letter and will transfer to the unit 42 (FIG. 3) for storage.

The computer will calculate the letter space for progressive scanning (line sequential scanning) and the unit 41 will store the data.

The cursor and the camera will scan the screen from a progressive signal generator and subsystem 2.

The computer will receive the data (after converting to digital form), compress the bits to one bit for line width and transfer to unit 40.

The unit 39 will store the data for future possible use into allocation point (the coordinates previously received from unit 38) and keyboard key value (received from unit 46).

The computer will transfer to unit 46 the keyboard key value from unit 41.

The unit 47 will store the data.

The above operations will be repeated for each letter or word ready by the video camera.

The computer will create a recognition file of the possible identification for each letter or word in order degree or possibility.

The unit 47 will store the data into identification order degree of possibility and the location coordinates.

The computer will load units 48 and 134 when the above operations will be finished.

The computer will compare each recognized word against contents of unabridged dictionary.

If the comparison is unequal the letter in the word will be replaced by the next possible letter for the next cycle. The comparison in replacement cycle loops are continuously repeating until the comparison is equal or the end of the letter replacement.

If the comparison is unequal the word and its location of the page will be stored for future computer actions. The future possible actions are:

(a) Corporation of the handwritten image by other method or the other word, previously recognized as correct by the loop repetitions.

(b) The operator assistance.

(c) Recognition by logical, or grammatical, or spellings or language rules. For an example:

Two book(s)—(S)-right and

Two book—wrong.

If the operation is finished the computer will transfer the data to unit 49 for storage.

The computer will load according to application computer program.

The applications of a preferred embodiment of the present invention are:

(a) Automatic computer coding the data and commands from handwritten script.

(b) Typing or printing the data from handwritten script.

(c) Automatic recitation of handwritten text.

(d) Automatic comprehensive of reading or selecting text.

(e) Identification of a person by handwriting or signature.

(f) etc.

Figure 4:
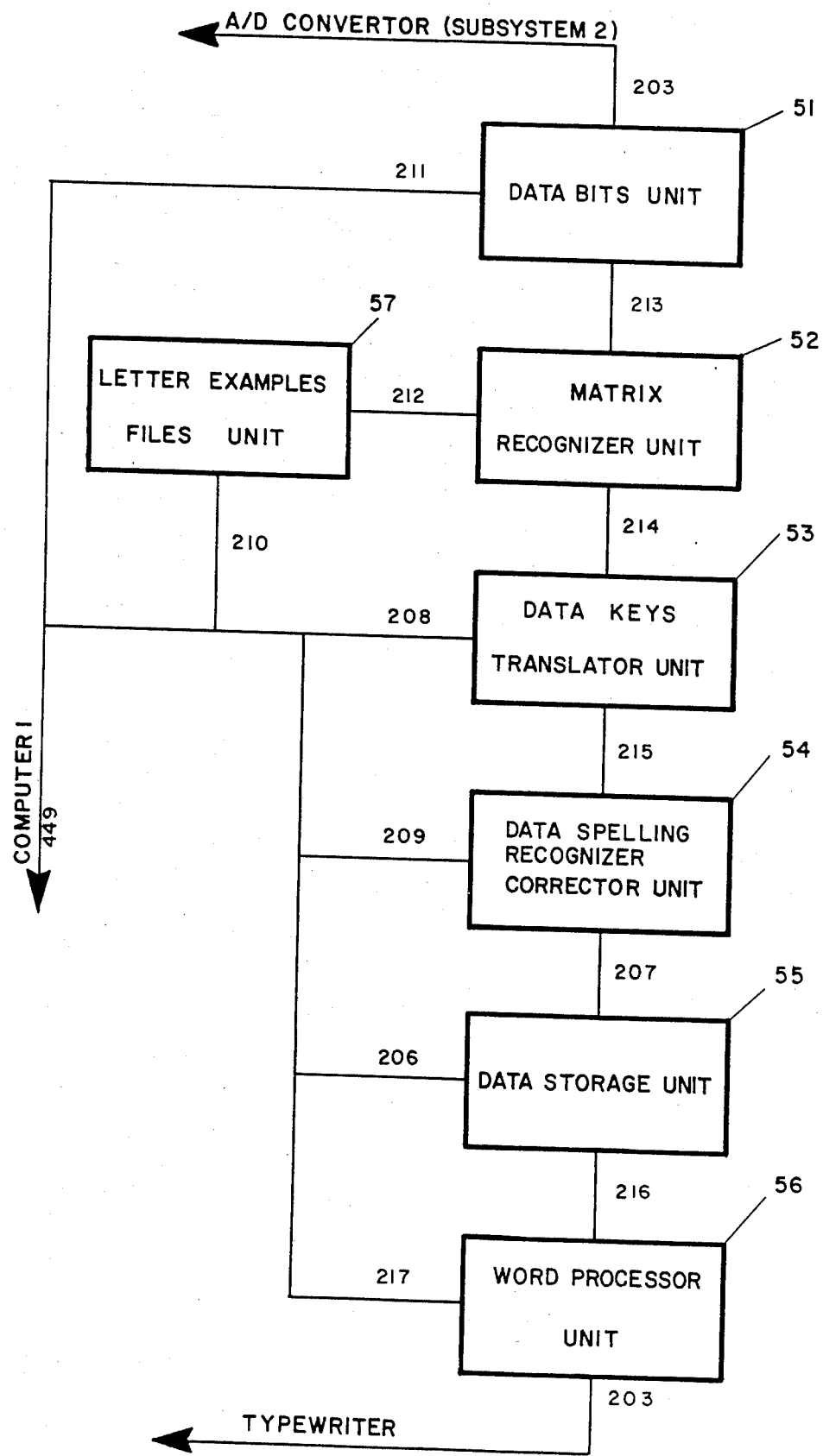
FIG. 4 discloses a block scheme of a text reading or coding division according to FIG. 1.

FIG. 4 discloses a print text reading division 11 (FIG. 1) for automatic coding the data.

Any type of printing letter or pattern are not variable character and therefore can be identified by a number value of the coordinates.

Each letter or pattern will be read, displayed and saved similar to the handwritten processing above.

The computer will calculate the coordinates values and the related coordinates for each letter or pattern and saved into a keyboard key value represented the letter of the keyboard for a recognition standard.

The optical device will read the letters of the patterns similar to handwriting above. The unit 51 will collect the bits and transfer to unit 52 for storage.

The computer will compute the coordinates of the data. The computer will:

(a) Compare the binary numbers of the data to the letter example files (unit 57).

(b) Compare the data coordinates (unit 57).

(c) Analog comparison the data signals to the letter example signal (after D/A converting).

The unit 52 will store the data.

The computer will replace the data by the keyboard key values.

The computer will compare each recognized word:

(a) Against contents of the dictionary.

(b) To other words which previously recognized as correct.

(c) To the words which recognized by other methods: (for an example: recognized by analog method).

1. The digital value of a letter shape will be D/A convertor and generated signal will control the switching of the reading circuits of the optical device therefore the circle will ignore other signal and the reading signal will be detected by the letter function.

2. An example of a pattern function converting of the data.

The reading signal from the optical device will be transferred to analog computer function device and the output of the device will A/D convertor for digital computer interfacing. The functional device will process the signal to definition functional character (increase, decrease, change directions, etc.). The information will be digitized and transfer to computer for operations.

Figure 5:
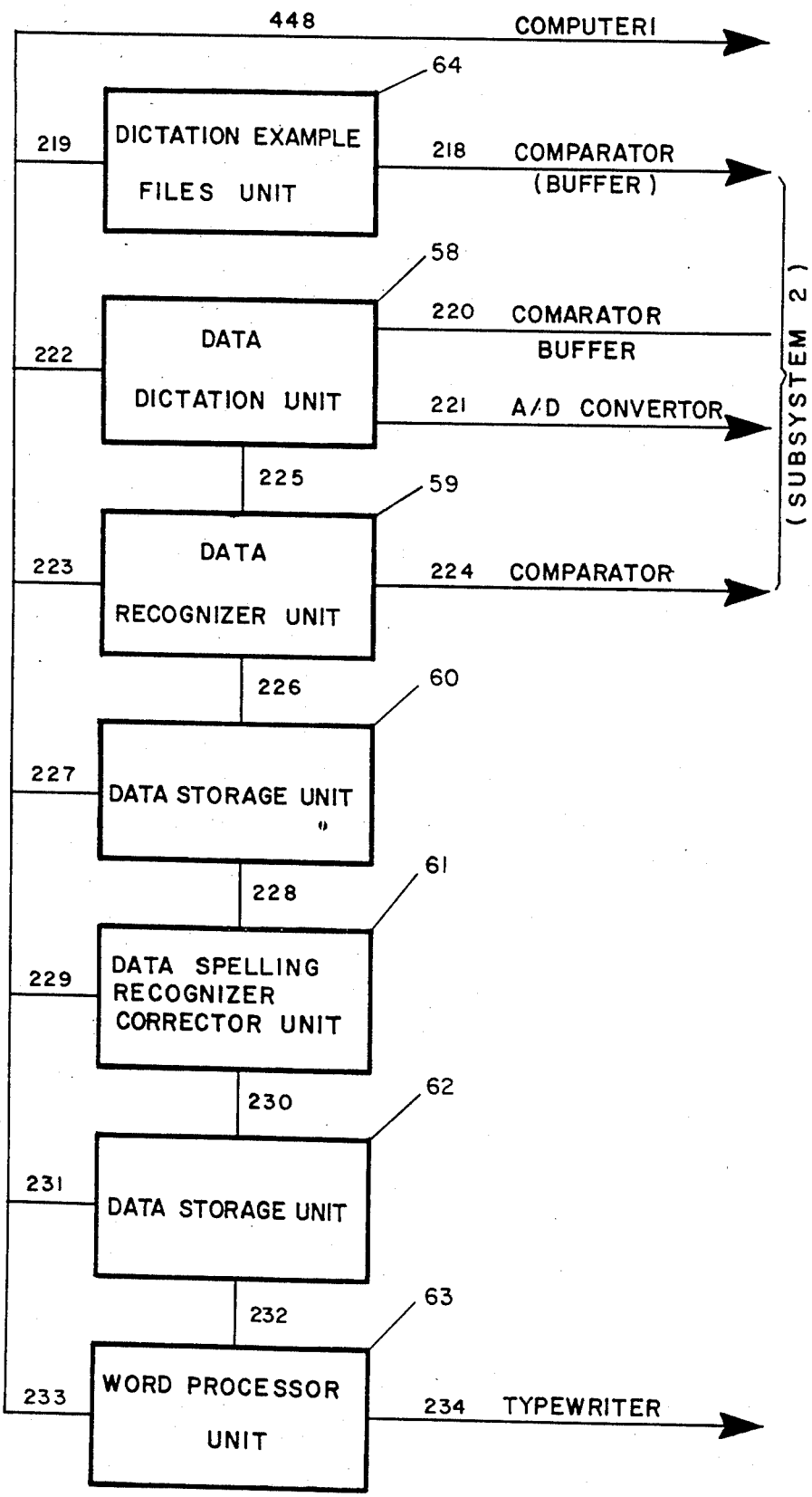
FIG. 5 discloses a block scheme of a dictation division according to FIG. 1.

The future operations by the units 55 and 56 and applications are similar to the handwritten above. FIG. 5 is an example of dictation 12 FIG. 1 for automatic typewriting from a dictated text.

The data received from the microphone 6 will be converted by the video chip with arithmetic, logic unit in the subsystem 2 to a digital form. The individual dictation letters and words will be picked up by computer and then transferred to its corresponding value on the keyboard.

Examples:

(a) The dictated word 'computer' is equal to the value of the word 'computer' resident of the keyboard.

(b) The violin performance of the note 'C' is equal to the value of the letter 'C' resident on the keyboard.

The operator will design any type of pattern display of the music notes or will use the letter reading division 11 FIG. 1 for reading a printed existing note type.

The operator enter strings of values to the computer, for example:

The pattern of music note 'C' equal to the value of the letter 'C' on the keyboard.

The operator will repeat the above operations for each dictated letter, word, punctuation symbols, numbers, etc. or for each music notes or any other audio image, or generator signals for testing electronic equipment.

The operator will save the sample for a recognition standard.

The computer will interface:

(a) The microphone 6 to the audio A/D convertor.

(b) The dictation divsion 12 to the subsystem 2 and to the analog and digital drive 4.

The computer will load the unit 64 and transfer the data to units 84, 86, 87, 89 and 90 to the subsystem 2.

The unit 84 will select a drive and load and the unit 90 will control the dictation process.

The data received from the unit 62 will be read and transferred to unit 87 for storage.

The data received from the microphone will digitized and transferred to unit 87 for writing. And computer with the unit 90 will control the processing.

The recognition of the dictated data can be analog or digital:

(a) Analog recognition of the data (1) The signal samples and the dictation data signals will be transferred from unit 87 to unit 86 for D/A converting by the subsystem 2 separately.

(2) The dictated data will be recognized by the sample data in subsystem 2 by any existing analog device or circles.

(3) The sample signals will be displayed on the screen and the computer by commands (read screen) will shift the dictated data horizontal or vertical for equal searching. The computer will transfer the information to the units 85, 86, 87 for control and transferring the data to unit 58 for storage.

(b) Digital recognition of the data (1) The dictated data will be digitized by A/D convertors and will be transferred to unit 87 for writing.

(2) The computer will compare the numbers value by reading memory and the information will be transferred to unit 58 for storage.

The computer will replace the dictated data image of a keyboard key value and transferred data to unit 59.

The unit 60 will collect the dictated data and will store into keyboard letter for dictation of a text or into any pattern design form of music notes for music performance.

The computer 1 will correct recognition of the music notes by comparing original music notes with keyboard standard notes.

If the original music notes equal the computer will transfer the data to unit 62 for output application (printing, screen display or the use).

If the original music notes are not equal the computer will recognize the data by other method: One from the analog recognition methods or will ask operation assistance.

The computer will display the dictated data on the screen 8 and dictated text will be printed.

If the dictated word is not correct the dictator will repeat and the computer will repeat the recognition process (the dictator will read the text on the screen).

If the dictated word is correct the unit 62 will collect for storage.

The computer programs or the operator by the keyboard will make the dictation text in a required use form and transfer to unit 63 for storage.

The application of the dictated data can be: Typewriting, coding data or identification of human personal voices.

The application of the music notes display can be used for automatic music notes printing or visual display from instrumental performance or for music teaching.

Figure 6:
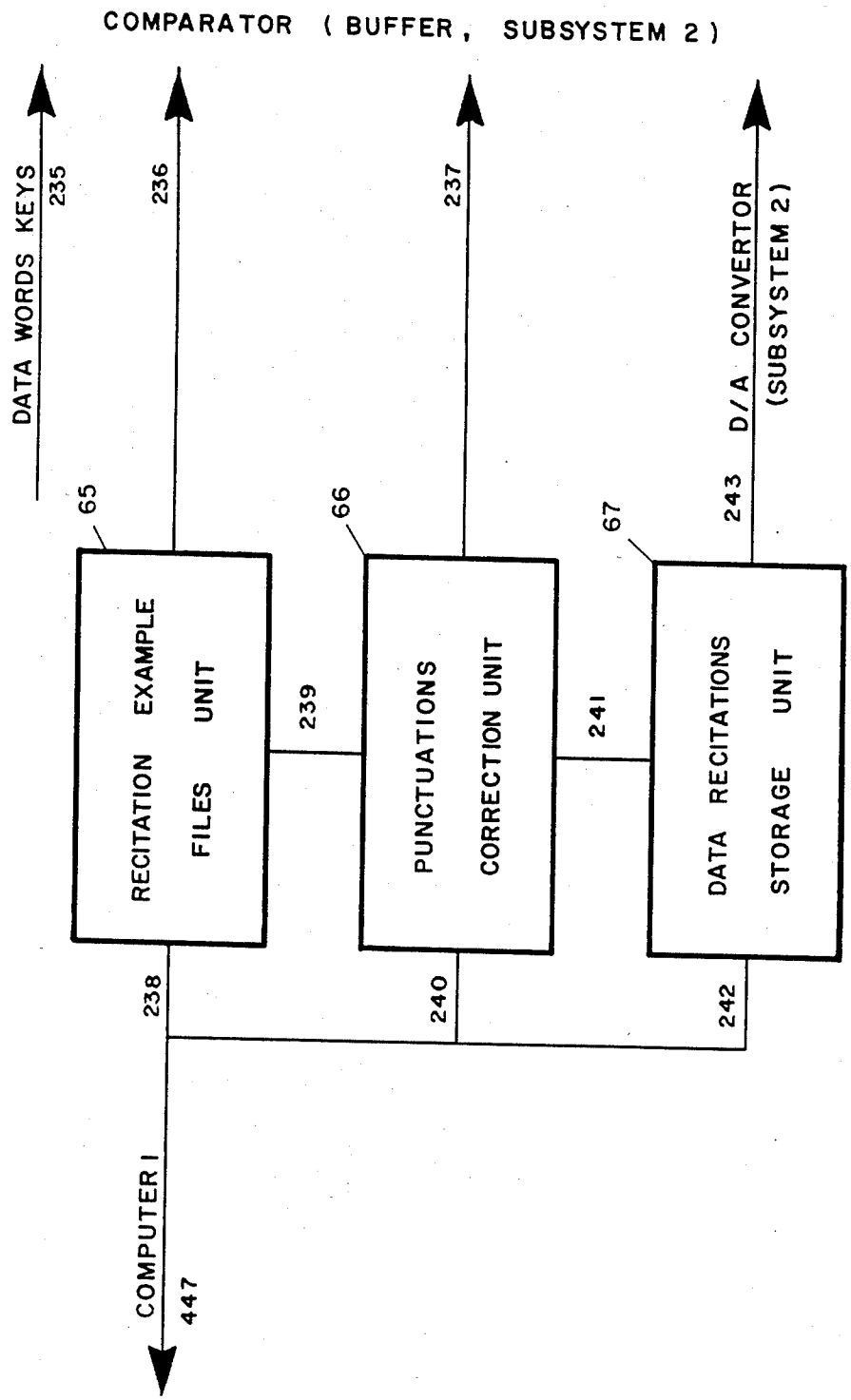
FIG. 6 discloses a block scheme of a recitation division according to FIG. 1.

FIG. 6 is an example of a recitation division 13 for converting the keyboard key values to real recitation image (audio).

The unit 65 will contain a dictionary of recited the words, letters, symbols etc. (digital form) and unit 66 will contain a dictionary of recitation words by punctuation marks.

The dictionary or the example files will be prepared by the dictation division 12 FIG. 5 similarly to dictation example files for each individual or for each music performance instrument. Examples:

1. A file or violin, piano, human voices performance.
2. A dictionary of recitation words and punctuations.

The keyboard key values will be equalized to music performance or to recitation words. Example:

1. A keyboard value of word recitation will load the dictated image of the word recitation.
2. A keyboard value of letter 'C' will equalize to the note 'C' image from a piano or violin.

The computer will load the unit 65 and 66 and transfer to 67 for assemble and store the data from entering the keyboard keys. The computer will retransfer the data to D/A convertor and to the speaker 5 for output performing. The unit 66 will correct the the punctuation data into punctuation mark tones. The division 13 can be used for instrumental music performance or recited words from reading the written notes patterns or words.

The division 13 can be used for identification voices.

The recitation standard (sample files) will be prepared similar to the dictated data by the division 12 above for each note or music performance or for each dictated letter or word.

The keyboard key values of the text word or music notes will load the recitation standard for the speaker performance.

Examples:

(a) A keyboard value of text (computer) will load the dictated image of the text (computer).

(b) A keyboard value of the music note 'C' will load a note 'C' from a violin or a piano.

The computer will read the word values from the keyboard and transfer to the unit 67 for storage.

The computer will convert the data words values to recitation values which will be transferred from units 65 and 66 to unit 67 and from unit 67 retransferred to the D/A convertor for speaker performance.

Figure 7:
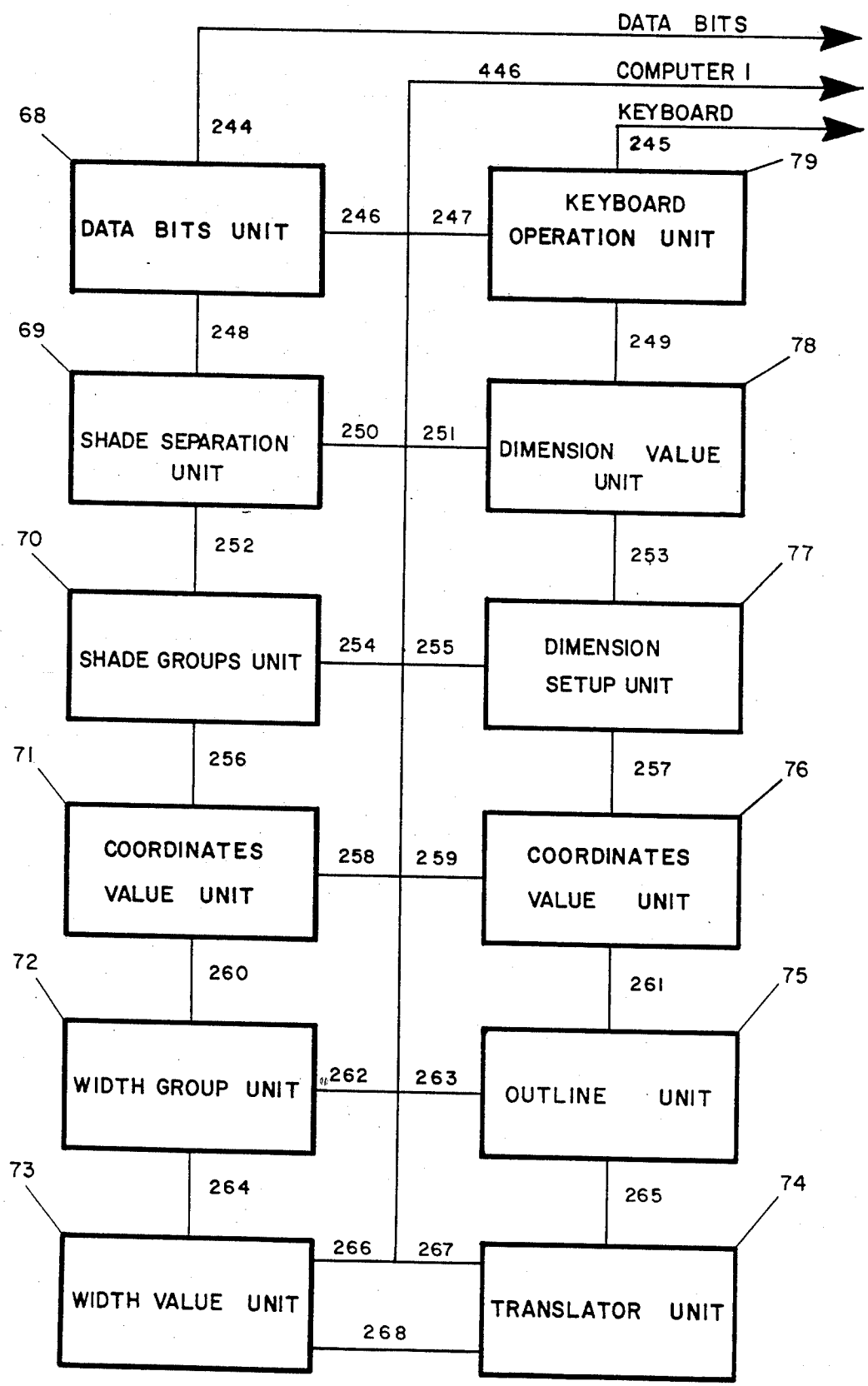
FIG. 7 discloses a block scheme of a model drawings division according to FIG. 1.

FIG. 7 is an example of a model drawings division 14 for automatic making drawings from models, pictures or objects. The recognition of the visible of the hidden lines of a model view as follow:

(a) The video camera looks perpendicularly toward one face of the model, he obtains a true view of the shape and size of the that side;

(b) The data will be digitized in subsystem 2 and will be transferred to unit 26 (FIG. 2) similar to handwritten script reading process above and received by unit 68 (FIG. 7);

(c) The computer will calculate the coordinate values of the view, edge view of the surface, and contour view of coverd surface. The coordinate values will be collected by unit 69;

(d) To get the intersections of two surfaces are:
  1. To get the top horizontal, intersection line of the two surfaces, revolve the model so as to bring the top of the model up, and toward you;
  2. To get the right-side of the virtual intersection line of the two surfaces, revolve the model so as to bring the right side to the right and toward you;
  3. To obtain the intersection lines of any or other sides, merely turn the model so as to bring those sides toward you;
  4. The revolve edge line of the sides view will be the intersection line;
  5. The revolve operation can be displayed on the screen;
  6. The computer will calculate the coordinates of the intersection lines and will transfer to the unit 69 (FIG. 7).

(e) The computer will add to the views the intersection lines and transfer the data to unit 70 for storage.

(f) The computer will separate the coordinates values of the edge, contour and intersection lines, and transfer to unit 72 for storage.

(g) The computer will calculate the cross lines points coordinates and the unit 71 will store them.

(h) The unit 73 will contain the thickness value of the line from program.

(i) The computer will convert the bits to the thickness value and the unit 74 will collect them for storage.

(j) The unit 75 will store the lines of the view meanings.

(k) The computer will receive the coordinates of the cross lines points from the unit 71 and will calculate the length value of the lines and transfer the data to unit 76 of storage.

(l) The unit 77 will contain a scale value standard for horizontal and vertical dimensions from a program.

(m) The computer will convert the coordinates to the dimension values and will transfer the data to unit 78 for storage.

(n) The unit 79 will contain the drawing legend, symbolic etc.

(o) The operator will load unit 78 by the keyboard and the data will be transfer to the unit 79 and will appear on the screen.

(p) The drawing lettering, symbolic, legends, lines standards and etc. will be prepared similarly to the letter reading by the division.

(r) The operator will provide the keyboard operations by software support for completing the drawings. For example:
  (a) converting to any scale or color;
  (b) Drawing corrections;
  (c) Editing symbolic, lettering and etc.

(s) The operator will transfer the data from unit 79 to unit 80 for continuation keyboard operations.

Figure 8:
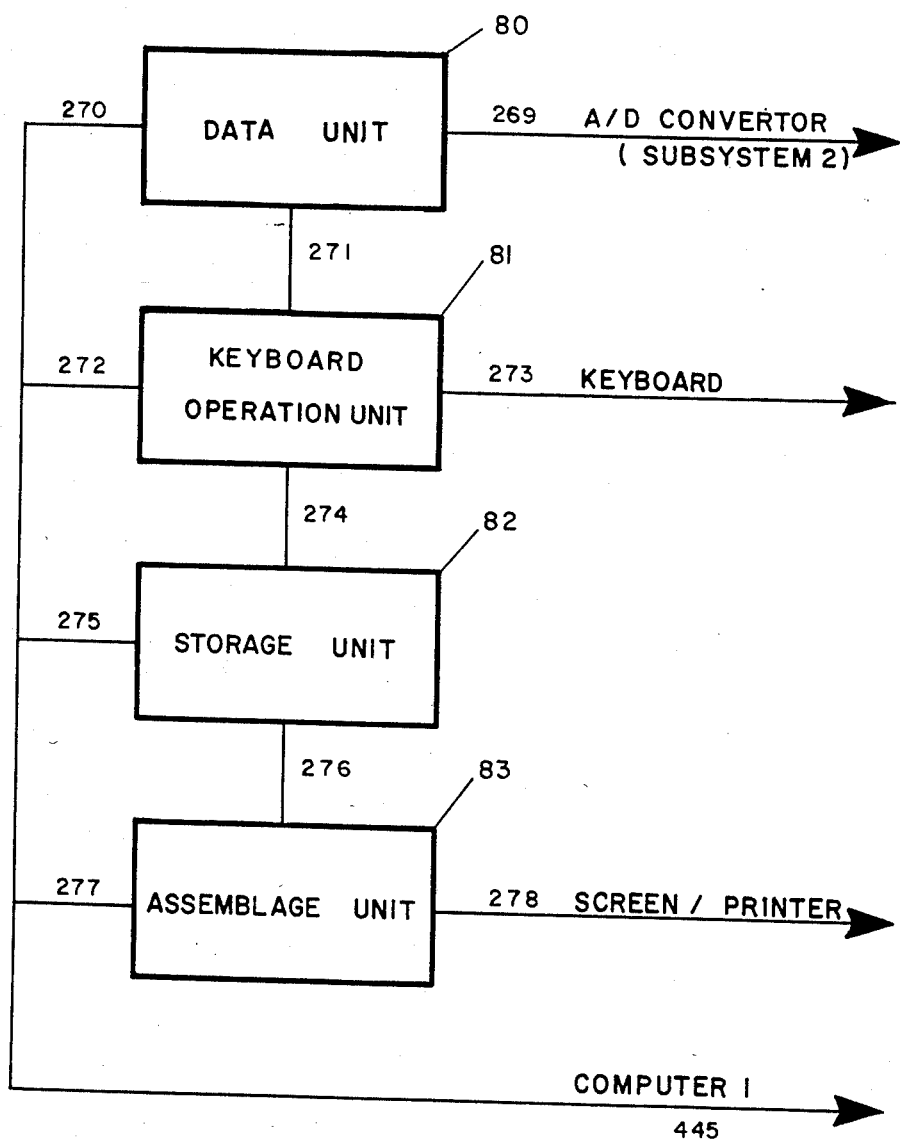
FIG. 8 discloses a block scheme of a drawing division according to FIG. 1.

FIG. 8 is an example of drawing division 15.

The optical device will read the existing drawings or graphics and after converting to digital form the unit 80 will assemble the data and the computer will transfer the data to the screen. The reading process is similar to lettering reading above. Similarly will be prepared the drawing standard view, standard details from a sheet surface reading. All drawing and graphical standards will be organized in a dictionary (files) and saved equal to a keyboard key value.

The dictionary will be loaded by the keyboard and each image can be called by the keyboard.

The operator will load units 80 and 81 and the data will be displayed on the screen.

The operator will move the image, change the scale, add standard patterns, dimensions, lines, letterings, or etc. or erase same areas, views, etc.

The operator will assemble the drawing by optical device reading and screen control.

The operator will change the video location by revolving or moving the original sheet into optical device reading.

The operator can operate by the keyboard or by the optical device (by changing the original location or covering under reading) by visual control of the screen. The data will be displayed on the screen any time when the optical device reads or when the image enters to the computer.

The operator can move, erase, add image or dimensions, line, areas, change scales, locations etc.

The operator can assemble the drawings from details by optical device reading or from file loading and overlapping them.

The computer can read the drawing by specification (list of details). Each detail will be stored into an image by a keyboard key value names or numbers according to the assembled drawing specifications.

The drawings can be assembled or printed in any color.

The drawings can be saved and loaded in analog or digital signal form by the combined analog and digital drive 16 (FIG. 1, FIG. 9).

The details can be recognized in assemble drawing similar to the letter reading recognized above. When the detail will be recognized it will be appeared on the screen by its view or complete drawing.

The unit 82 will collect the data from the keyboard or screen operations and the unit 83 will store the complete assemble drowning for outputting operations (saving or printing).

FIG. 9 is an example of a combined analog and digital drive 16.

The drive of a preferred embodiment of the present invention will be described according to FIG. 9.

The drive is utilized to analog random access memory in digitized representation and used for access data in auxiliary direct storage.

The drive is utilized to fast multiple converting and switching of the data or commands from analog to digital or vice versa suitable for drive operations.

The drive utilized known diskettes (tapes) and heads suitable for use in the drive.

The drive utilized the known A/D and D/A convertors for interfacing the digital computer (the drive can complicate with own convertors for significant operative).

The data or commands are simultaneously fast converted from one signal form to others and therefore can be operated by analog or digital signal form of the data or commands.

The data can be stored and loaded by digital or analog commands

The data addresses can be direct by converting the analog addresses to digital or overlapping digital address over the analog data or by analog signal matching (analog switching).

DRIVE FORMATING

The drive formatting will be in digital form and then D/A converted or overlapping the analog data writing.

When the drive is loaded the analog addresses value will be converted to digital form for drive selection and binary control of the data.

The unit 88 contain commands for drive formatting and marking.

The unit 89 contain commands for over analog data overlapped reading and writing.

The unit 90 contain commands for binary control of the analog data.

The unit 84 contains commands for drive selection (digital or analog).

The unit 85 will collect the analog commands which A/D convertor.

The unit 87 is utilized for digital read and write operations and unit 86 for digital data storage and transferring to D/A convertor.

DRIVE WRITE

The drive will be formatted and marked by commands from unit 87.

The data will be written in unit 87 by control signal from units 84 and 90.

The unit 86 will collect the information and transfer to D/A convertor for saving in analog drive.

DRIVE READ

The addresses signal value will be digitized or overlapped read.

The unit 88 or 89 will receive the address value and distribute between units 90 and 84.

The unit 84 will select the drive for reading and will be read the data into binary control.

The unit 87 will collect the data from and transfer to unit 86 for computer commands operations.

Figure 10:
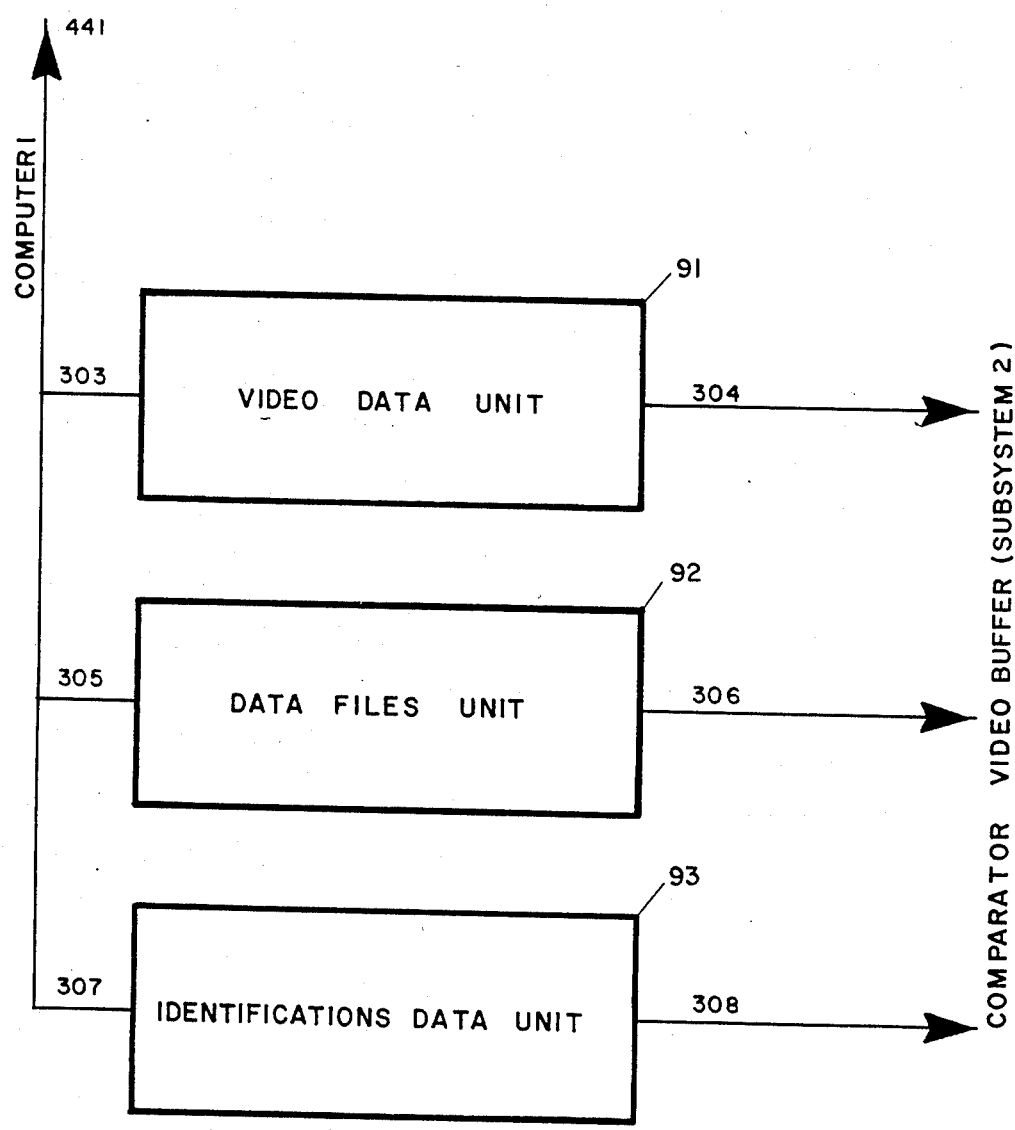
FIG. 10 discloses a block scheme of an identification division according to FIG. 1.

FIG. 10 is an example of identification division 17 FIG. 1. Preparation of the data recognition standard (files).

The video camera will transfer and read to computer screen for visual control and to A/D convertors for digitizing and entering to the computer.

The data will be equalized to a keyboard key value for address name or number. The computer will convert the coordinate values to numbers value and the unit 91 will store the data for saving.

IDENTIFICATION PROCESS

The recognition of the data can be digital or analog.

Digital

The computer will load the unit 92 and transfer the data to comparator of the video buffer (subsystem 2).

The video camera will read the data and after digitizing will be compared in video buffer and the information will be transferred by the computer to unit 39 for storage. If equal the coordinate value or numbers computer will transfer the data to the used. If unequal the computer will call other files for comparing with data.

Analog

The computer will load the unit 92 and the data will be D/A converted and transferred to the screen. The video camera will read the data and transfer to the same screen. The computer by commands (read-screen) will compare the data to the screen display and the result will be digitized for computer use for identification the data.

Figure 12:
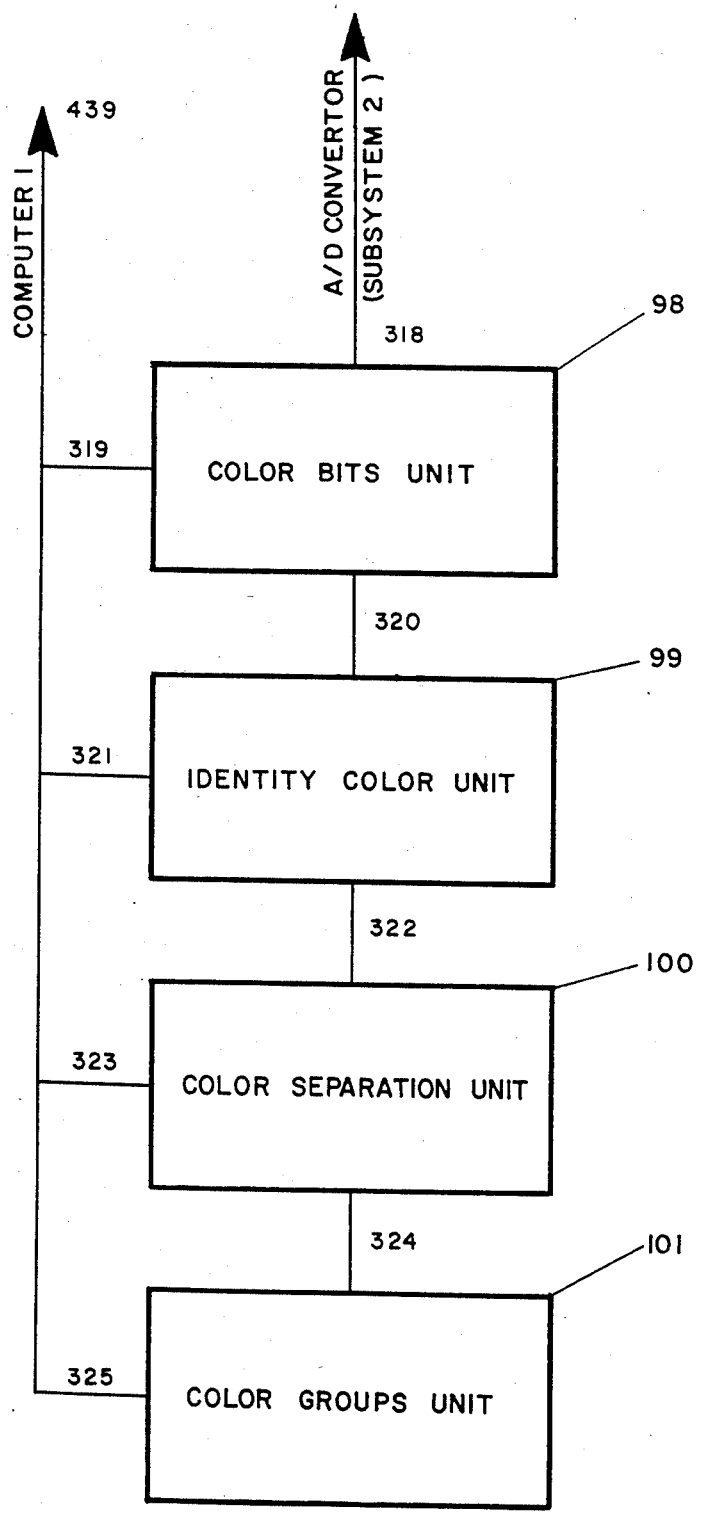
FIG. 12 discloses a block scheme of an identification by color division according to FIG. 1.

FIG. 12 is an example of identification data by color division 19 FIG. 1.

The recognition standard is a color value of the data which presented as a typical color character of the whole data. The data will be read by the video device (video camera) and after digitizing in subsystem 2 will be transferred to computer for bites separation and identification.

The unit 24 (FIG. 2) will store the data and computer will transfer the data to unit 27.

The unit 98 will received the color data and the computer will identify the data bits by color means and the information will be transferred to the unit 99.

The computer will calculate the coordinate values of each point by each color means and the unit 100 will receive the information. The computer will save the data into a keyboard key value representation for identification standard and loading. The video camera will read the data and computer will operate similarly above. The data will be overlapped by recognition standard in unit 100 and the computer will read the information for recognizing the data.

The recognized data will be transferred to the unit 101 for storage group meaning. The data from 101 will be retransferred to other divisions or for user applications.

Figure 11:
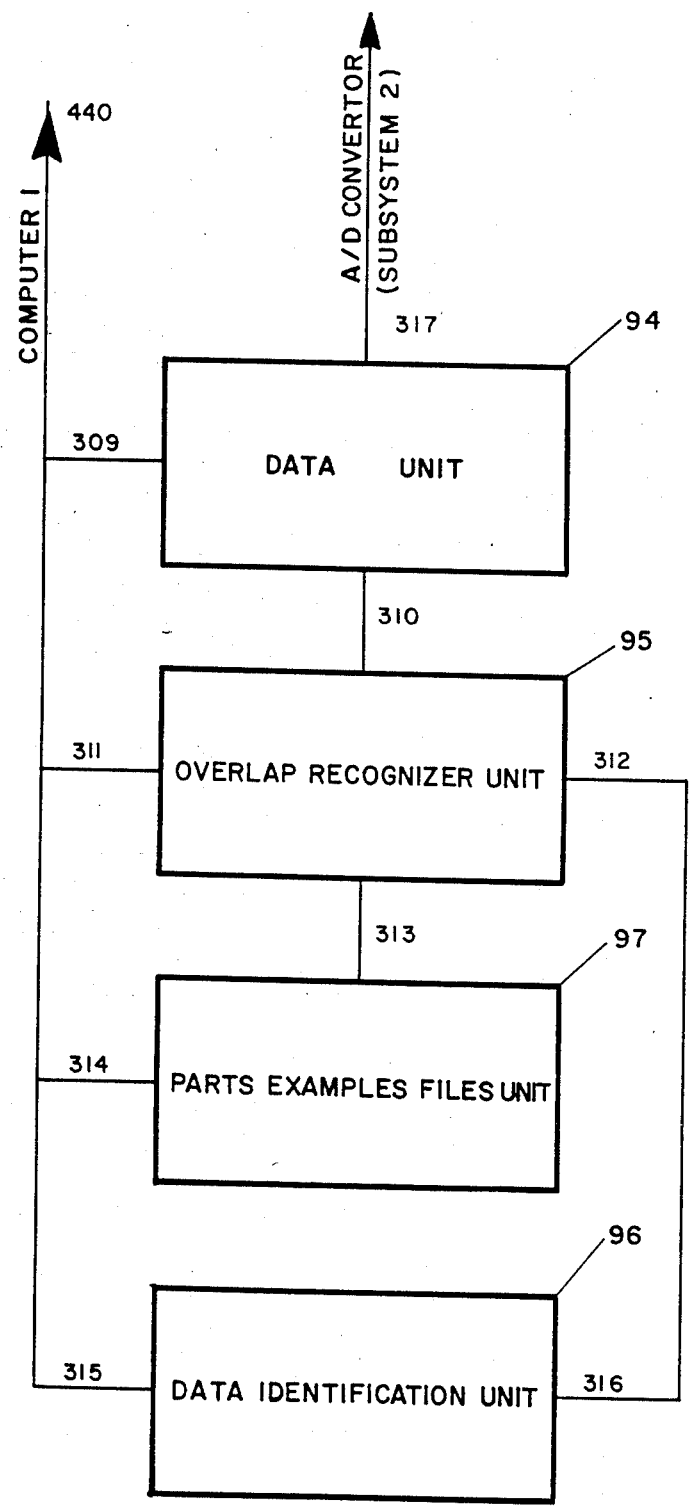
FIG. 11 discloses a block scheme of an identification by parts division according to FIG. 1.

FIG. 11 is an example of identification data by part division 18 FIG. 1.

The recognition standard is a particular part which presents as a typical character of the whole data (eyes, nose, view, face, etc.) The data will be read by the video camera and after digitizing will be transferred to unit 94.

The unit 94 will store the data and display on the computer screen. The computer by cursor move by keyboard command will select the part(s) for computer entering by a keyboard key value representation for identification. The computer will save the coordinate values or numbers of the part(s) and horizontal/vertical locations. The unit 97 will store the data.

METHODS OF THE RECOGNITION PROCESS

Method 1

The computer will load the unit 97 and transfer the data to unit 95 for storage. The camera will read the data and after digitizing transfer to unit 94. The computer by 'read and write' memory in unit 95 will overlap 'write and read' the coordinate values for recognizing and the information will transfer to unit 96 for storing or for user applications.

Method 2

The computer will load the unit 97 and display the data on the screen The data will be read by the video camera and transferred to the same screen.

The computer by the command 'read window' will read 'the window data' for recognition and the unit 96 will collect the information for storage.

Method 3

The computer will load the unit 97 and the data will be D/A converted in subsystem 2. The horizontal and vertical lines will generate a scan signal for the video camera reading (window). The signal from the video camera will be compared to the converted signal from the unit 97 and the information will be digitized and transferred to the computer for recognition.

The unit 96 will store the information for user application.

Figure 13:
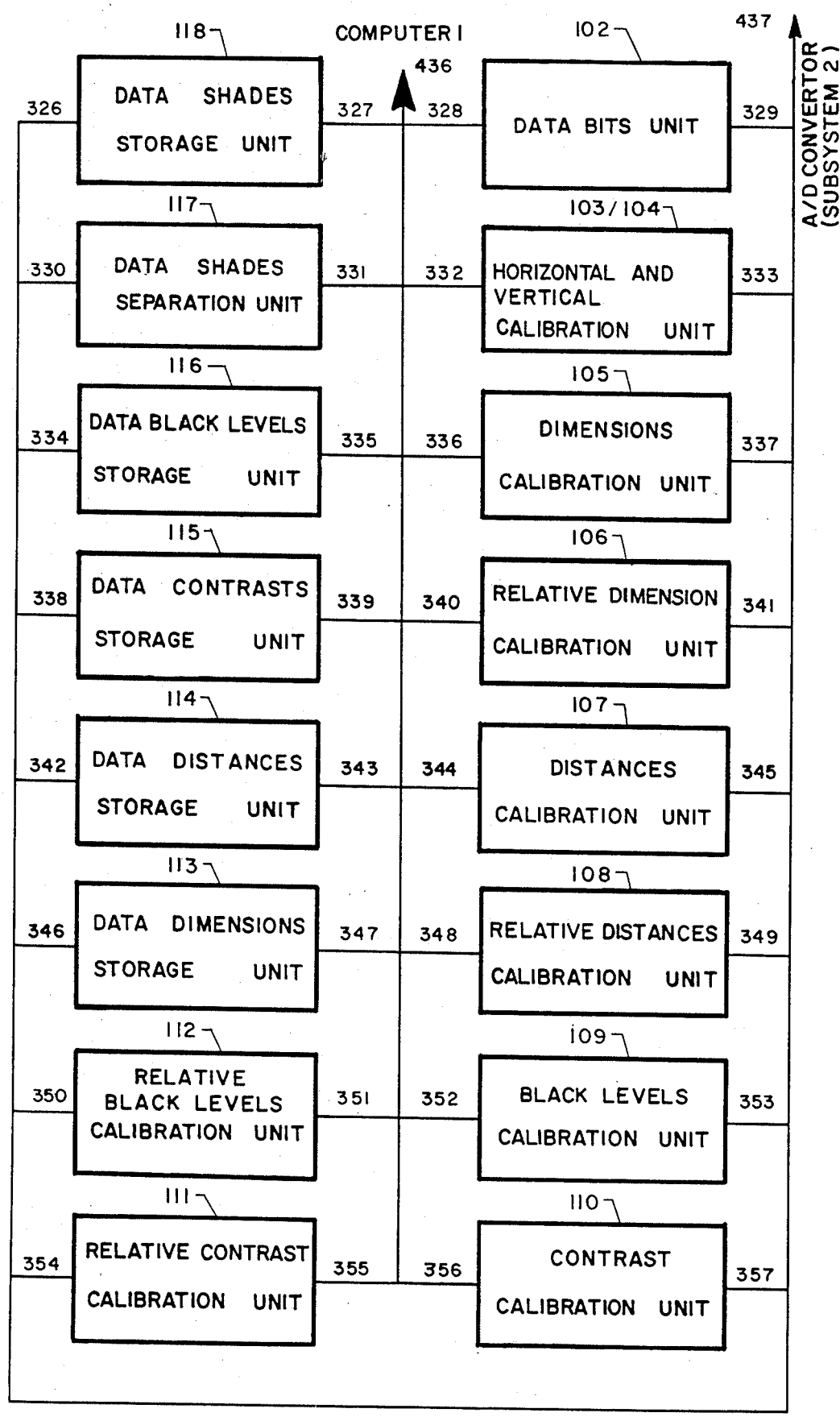
FIG. 13 discloses a block scheme of a measure division according to FIG. 1.

FIG. 13 is an example of a measure division 20 FIG. 1 for measuring of the video image.

The calibration process (or the measuring preparations).

The video camera and the video devices. (circuits) will be adjusted in a fixed to data location and light.

Vertical and Horizontal calibration.

The video camera will read the horizontal and vertical measure scale. The data will be digitized and transferred to unit 102 and displayed on the screen. The operator will trace the scale points by cursor and enter the measure values. The unit 103 and 104 will store the computer scale values for vertical and horizontal locations (separately.

The calibration of the data dimension and the distances.

The video camera will read the data and after digitizing will display on the screen similar of the above. The operator will load the computer scale (unit 103 and 104) and will measure the dimensions and enter the absolute and relative values.

The operator will change the video camera distance from the object and enter the numbers of measuring. The unit 105, 106, 107 and 108 will store them for measure standards.

The black levels and contrast calibration.

The video camera will read a scale of differences black levels and contrast values.

The computer will interface the black and the contrast control circles to A/D convertors in subsystem 2.

The data will be transferred to the screen and the operator will enter the data from the screen to keyboard key values representation. The computer will transfer the data to unit 109 or 112 for storage The absolute value of the data and to unit 110 or 111 for relative value of the data storage.

The units 109, 110, 111, 112 will contain a measure standard of the data. The dimension of the data measuring.

The reading process is similar to the calibration above. The data will overlap written in the units 105, 106, 107, 108 and the computer will read the memory of the above units.

The information will be collected by the units 113, 114 for converting to numbers and store for user application. The black level or contrast of the data measuring.

The reading process is similar to the calibration above. The unit 118 will collect the data for storage.

The computer will compare the data bits values to the values in the units 109, 110, 111, 112 and the information will be retransferred to unit 115 or 116 for user application.

Figure 14:
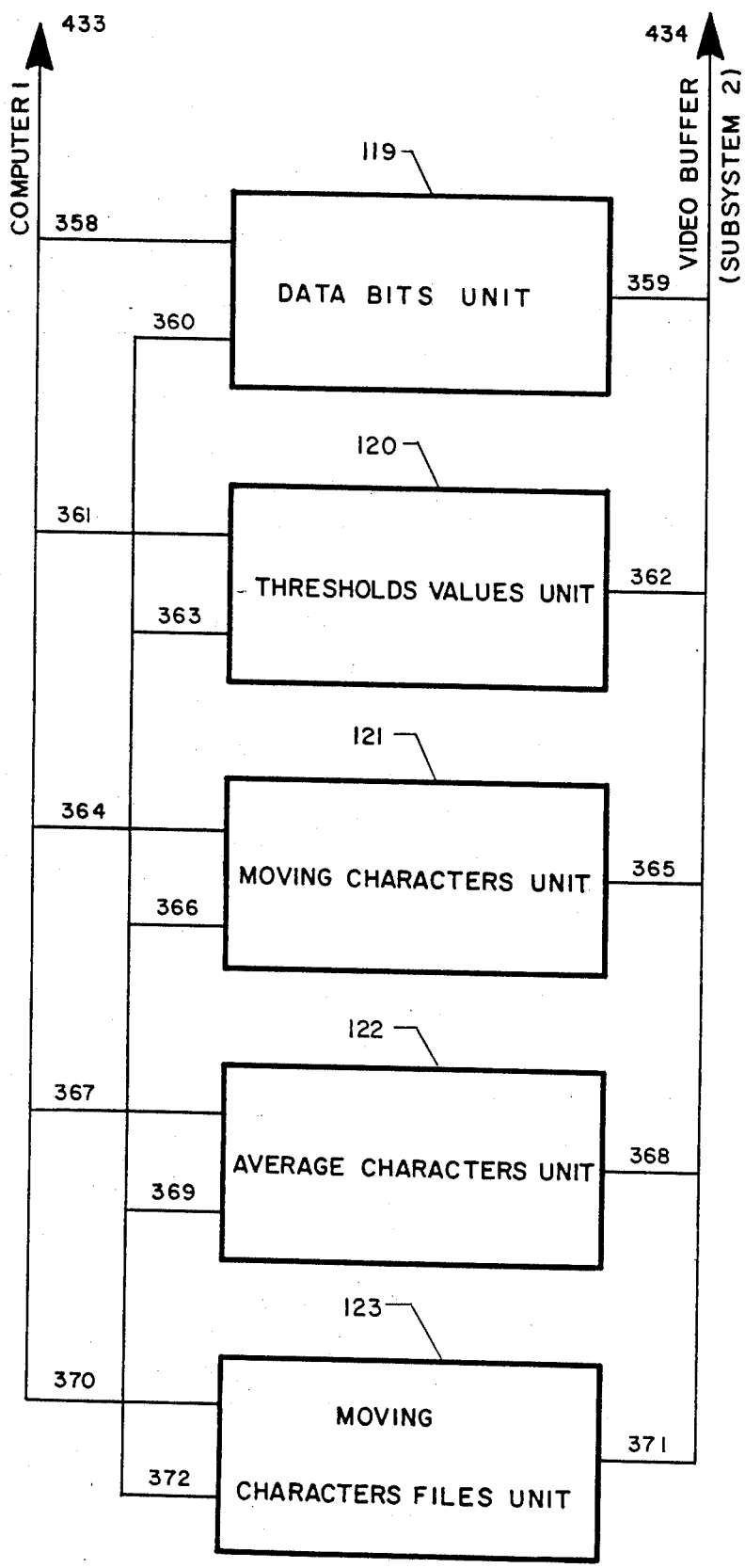
FIG. 14 discloses a block scheme of a moving division according to FIG. 1.

FIG. 14 is an example of a moving division 21 FIG. 1 for identification of the moving differences between one data scanning frame and another.

The recognition standard is a value of differences between one data scanning frame and another.

The video camera will read the data and D/A convertor will digitized. The unit 120 will assemble the data from the first frame scanning of video camera and the unit 119 will assemble the image from the next frame scanning.

The data from previous and current frame scanning will be compared in the video buffer (subsystem 2) and the result image will be deposited in the unit 21 for assembling and primary storage of the cycles of the data frame scanning.

The cycle of the data frame scanning will be compared in the video buffer and the resulting image of the N-cycles will be deposit in unit 122.

The operator will enter the data from the unit 122 equally to a keyboard key value representation for identification. The data will be assembled in unit 123 and will be used for a recognition standard. The recognition process is similar to preparation of the recognition standard above.

The computer will load the unit 123 for comparison with the data in unit 122 for user applications.

Figure 15:
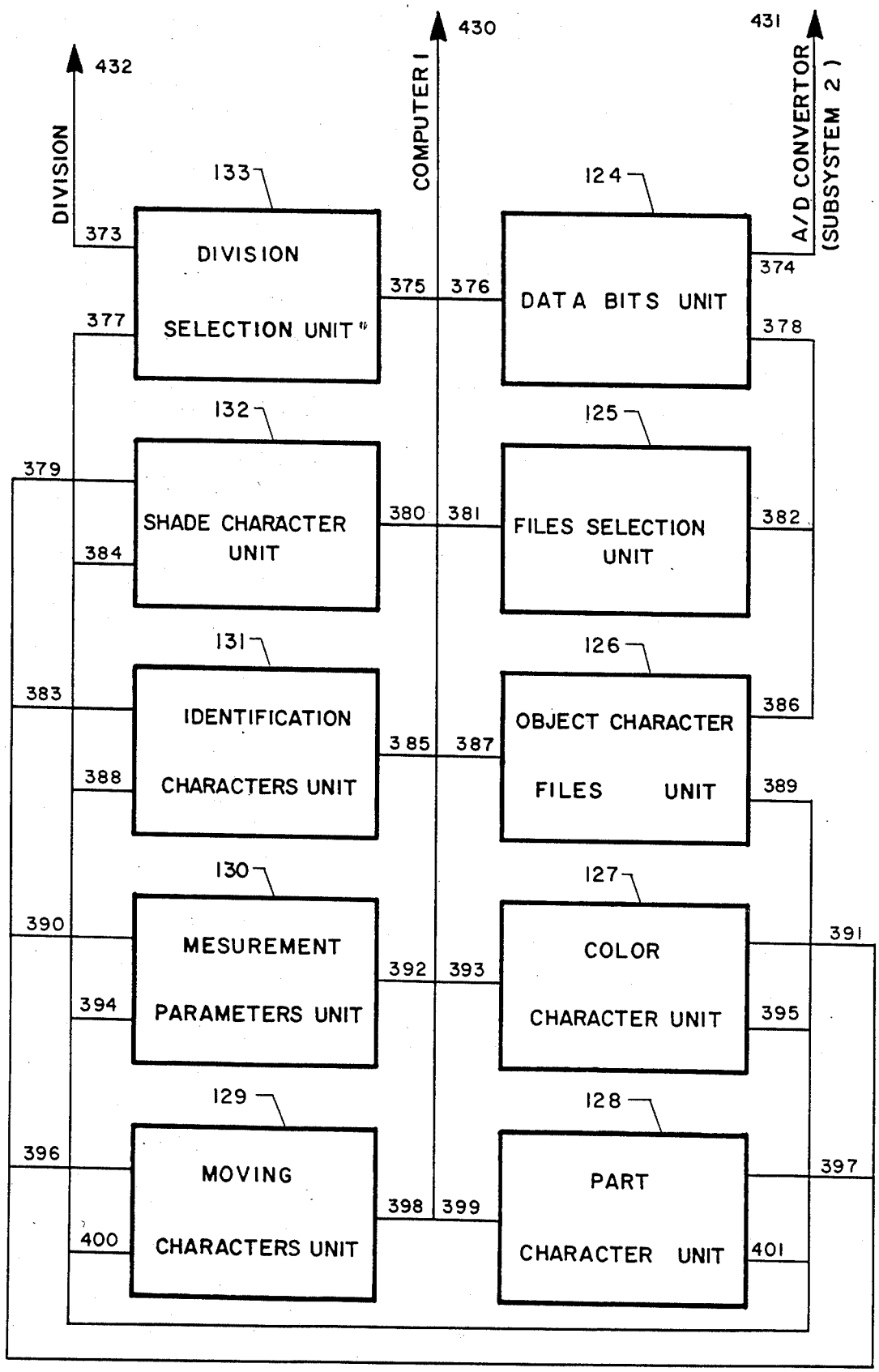
FIG. 15 discloses a block scheme of an object division according to FIG. 1.

FIG. 15 is an example of an object identification division 22 FIG. 1

The unit 126 will explain the recognition standards of the object.

The unit 125 will contain commands for calling, loading and interfacing the recognition standards to the divisions.

The unit 133 will contain commands and instructions for interfacing the divisions, communication between the divisions and the computer. The unit 124 will received the data read by the video camera(s) from the video block and from the subsystem 2.

The computer will separate the data bits by physical means and the unit 125 will assemble the data.

The computer will select and call the recognition files from unit 126.

The unit 125 will selective retransfer the data and the recognition files (standards) to the adding units: 127, 128, 129, 130, 131 and 132 for primary storage into definition values.

The computer will select the identification divisions and will retransfer the recognition files and definition values of the data to the divisions for continuation operations.

Now, an example for identification a personal in an area of a preferred embodiment of the present invention shown in FIG. 15 will be described briefly.

1. The video camera (S) will be picking up the approach of a person. The unit 124 will receive the data and the computer will select the moving recognition files (standards) from the unit 126 and division from the unit 133 for identification of the gait of the person. The recognition file and the data will be transferred to unit 129 and retransfer to the division 21 (FIG. 1 and FIG. 14). The unit 133 will receive the information and the computer will select the next identification character, for an example: the persons height 2. The computer similar to the above, will select the measurement division 20 (FIG. 1, FIG. 13) and unit 130 will retransfer the data and the recognition standards to division 20 FIG. 13. The unit 133 will receive the information and the computer will select the next identification character, for an example: the persons color of hair or color of eyes. The computer, similar to above will select the color division 19 (FIG. 1, FIG. 12). The unit 127 will retransfer the data and the recognition standard to the division 19 FIG. 12. The unit 133 will receive the information and the computer will select the next identification character, for an example: the persons face.

3. The computer similar to the above will select the division 17 FIG. 1 and FIG. 10 and the unit 131 will retransfer the data and the recognized files to division 17. The unit 133 will receive information and the computer will select the next identification character, for an example: the persons palm or nose.

4. The computer similar to the above will select the division 18 FIG. 1 and FIG. 11 and the unit 128 will retransfer the data and the recognized standards to the division 18. Similarly the computer will select the next identification character, for an example: the persons face part and proportions and the computer will select again the measurement division 20. Similar the computer can select the next identification character, for an example: the complex shade. The computer can select the voice or handwritten character of the person for identification. For an example: the user will ask from the person some questions on some written data and the computer will select the dictation 12 or handwritten 11.

Figure 16:
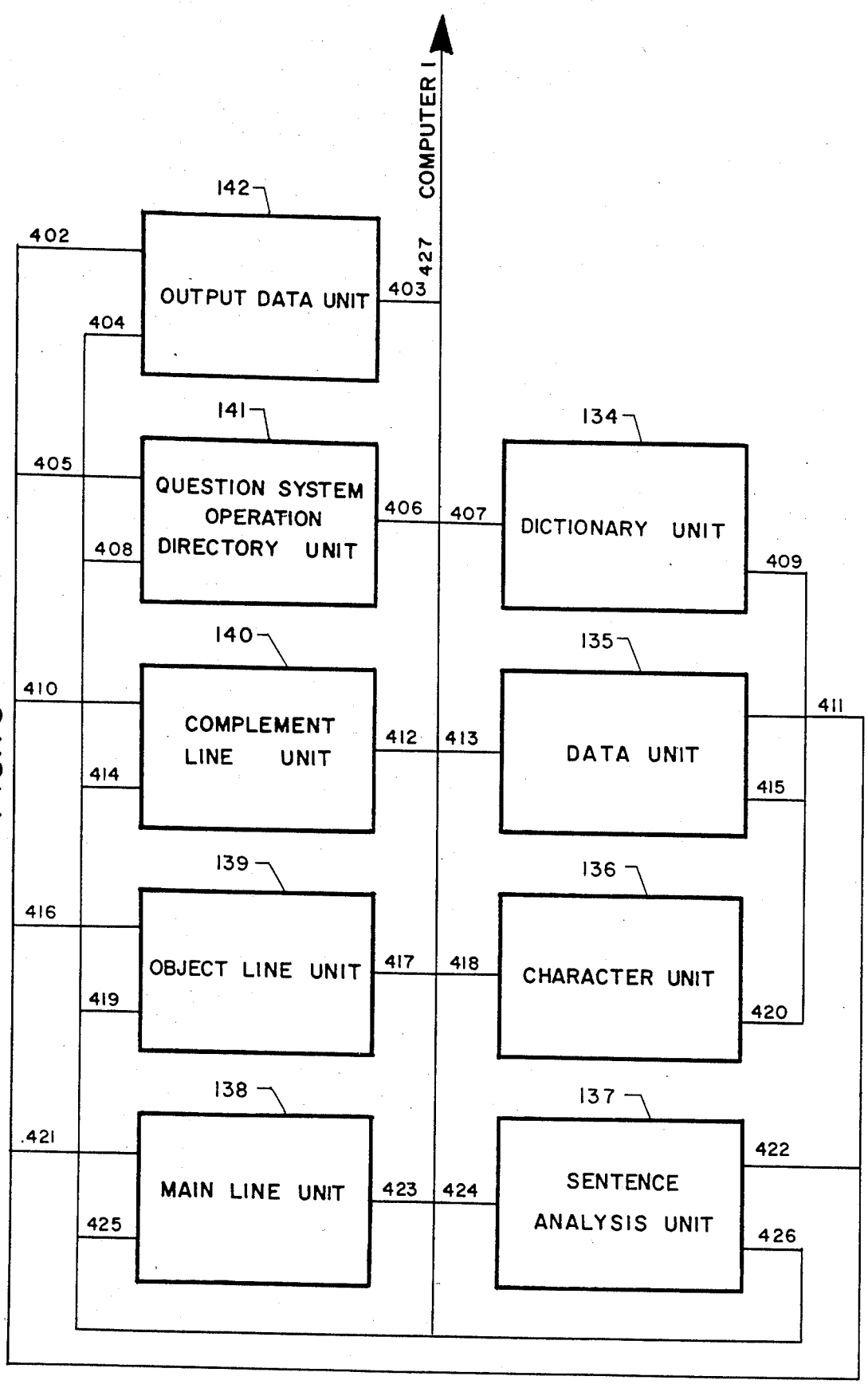
FIG. 16 discloses a block scheme of a language reading division according to block 1.

FIG. 16 discloses an example of a division 23 for comprehensible human language reading.

The computer 1 will compare the data text to the dictionary (unit 134) by sentence ordering for receiving the information and the marks (flags) for each word and sentence.

The unit 135 will assemble the data text by sentence ordering into punctuation (point, question mark, commas, etc.) means, into questions (for answer by the word) for computer instruction and commands and word marks (flags) for computer indicate signaling. The unit 134 will contain a dictionary (general and special) which operationally can be divided into three main parts.

The first one comprises questions of which each word will answer for computer instructions and commands, the second one comprises a dictionary of words in all spelling forms for receiving the needed information about each word and the third part one comprises word marks (flags) for computer indicate signaling, getting from definition classes, subclasses and groups (general and specific) which the word belong into:

(a) physical, logical, related words, synonyms, principal part, sex, plural or single, etc. means;

(b) probability subordinate the word to another word, dependently and independently characteristics;

(c) inflicted forms and the meanings of them, conference within, difference times, etc.

(d) part of speech and sentence, and the agreement with them word;

(e) spelling definition marks (flags);

(f) words which shown the shades means of the word;

(g) words which will usually communicated (logically, physically, grammatically, etc with them data word and support words (articles, up, etc.);

(h) specific marks (flags) of the read word getting from spellings, grammars, logical and physical operations.

The computer will analyze each word for recognition the conference within the parts of the sentence (verbs, subjects, objects, etc.) and order degree of importance of each word into programs and definitions marks (flags), questions (of which the will answer), rules and logical operations.

The computer will search the sentences to finding the similar, analogous word by meaning, related, synonyms, or communicated words in the sentences for creating a structure of coherence within one and all sentences in text.

The computer will search and separate the coherent structure of the text for creating lines of subjects, objects, etc. and moving power (the motor of the lines and whole data text.

The computer will find the dependent and independent subjects and predicates for creating a order degree of importance of the data text into main (subjects) and dependent (predicates) sublines for each line and commuication keys between all lines.

The keys are questions to the part of the lines which will load the lines into communications words, marks (flags) for automatically, or by particular questions follow the subjects and ideas of the data text in order degree of importance.

The unit 135 will assemble the data text and unit 136 will store the data text by sentences ordering into punctuation means and questions of which the word will answer for computer instructions and commands and into words, etc. marks (flags) for computer indicate signaling.

Unit 137 will assemble and store the data into coherent structures within one sentence and whole data text.

Unit 138 will assemble and store the main lines of the data (whom or what the data is about) and moving power (the motor) of the data (simple subject and main verb).

Unit 139 will assemble and move the object lines of the data text (lines that receives the action of the moving power of the data text.

Unit 140 will assemble and store the complement lines, sublines, groups in order degree of importance.

The computer will create and the unit will assemble and store a system of questions to the lines which are keys of commands and instructions for automatic loading the lines for following the subjects and ideas of the data text in order degree of importance the operator can interrupt the follow of the data text describing by particular questions.

Figure 17:
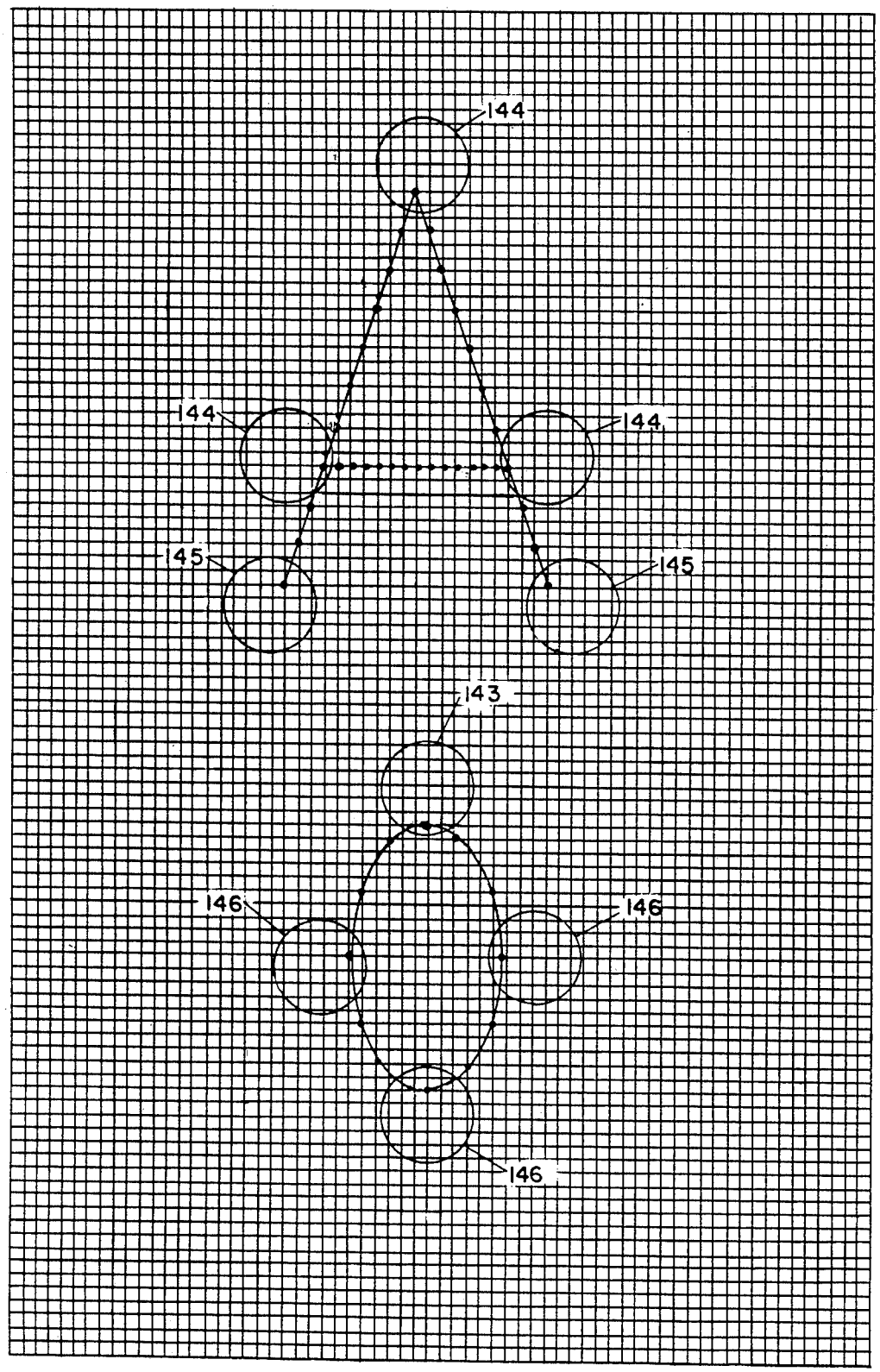
FIG. 17 discloses a pattern of function describing of the data according to the present invention.

FIG. 17 discloses an example of a pattern of function converting of the data.

The function converting of the data will be performed into functional analog or digital devices or into coordinates calculating.

Figure 18:
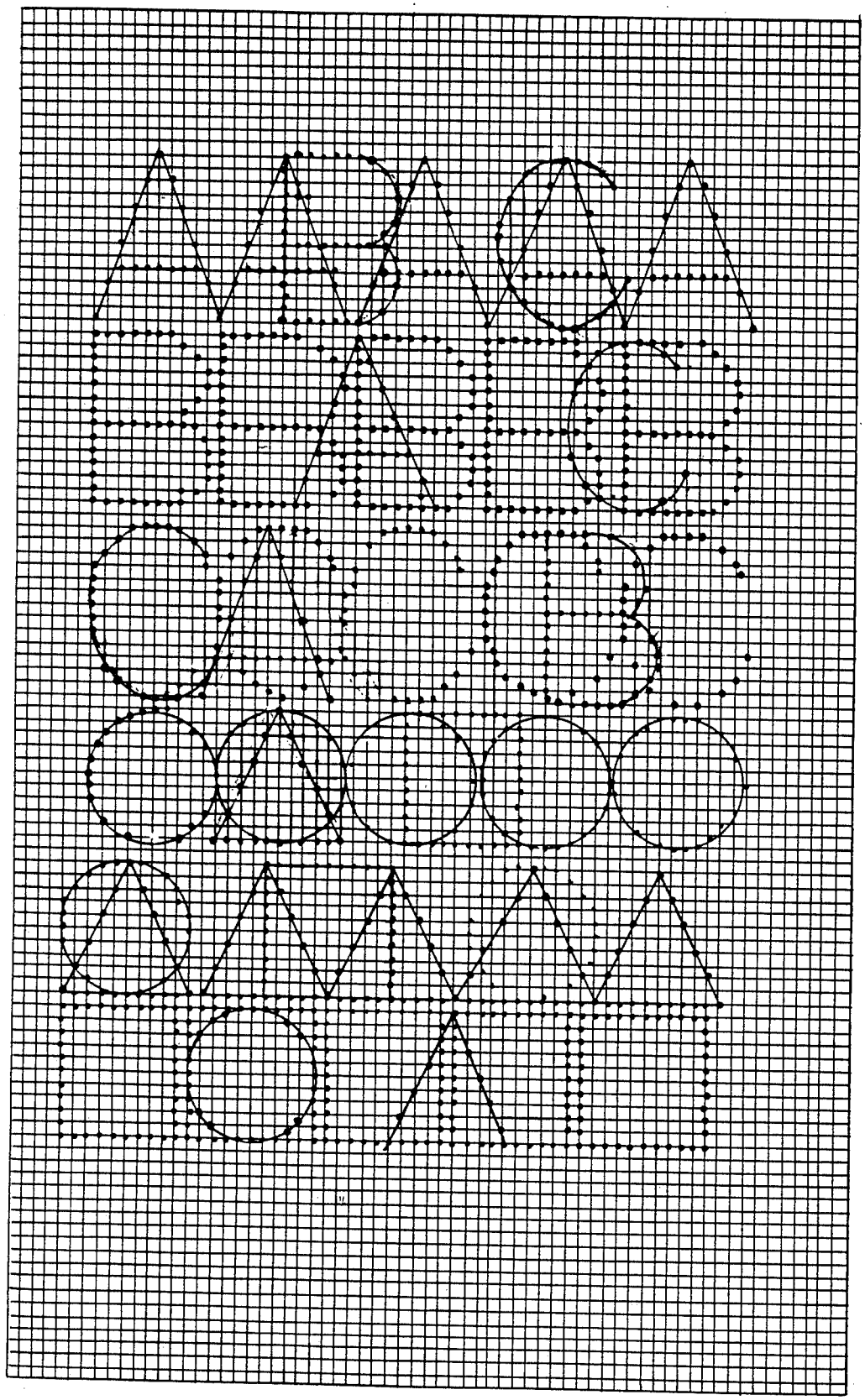
FIG. 18 discloses a pattern of the overlap matchings recognizer of the data according to the present invention.

It is the read and write: "on", "off", "stop" or a function of the following flags:

1. A flag indicating if "reader (writer)" or cursor was down since last operation;
2. A flag returns indicating the "X" coordinate where cursor (reader or writer) was last activated;
3. A flag returns indicating the "Y" coordinate where cursor (reader or writer) was last activated;
4. A flag returns indicating the current cursor (reader or writer) switch value (down, up);
5. A flag returns indicating the last known valid "X" coordinate;
6. A flag returns indicating the last known valid "Y" coordinate:
7. A flag returns indicating the character row position were the cursor (reader, writer) was last activated:
8. A flag returns the character column position were the cursor (reader, writer) was last activated:
9. A flag returns indicating of the known valid character row:
10. A flag returns indicating of the known valid character column:

It is the definition flags of the function of data:
A line width bits value one or zero;
A line will be read to the end;
A read reverse to the cross point 144 or to the start point 143 for starting a new line read;
A read order from start point 143 from upper to down left;
A point of coordinate change directions 146;
A X=> is increased by coordinate "X" direction;
A Y=> is increased by coordinate "Y" direction;
A X=< is decreased by coordinate "X" direction;
A Y=< is decreased by coordinate "Y" direction;
A X=Y is equal by "X" and "Y" directions;
A X=0 is ignored by "X" direction;
A Y=0 is ignored by "Y" direction;
A X>Y is a higher increase by "X" direction;
A Y<X is a higher decrease by "Y" directions;
A X,Y is independent of direction changes or different dimension signs;
A X2=X1 is a constant value of "X" coordinate;
A Y2=Y1 is a constant value of "Y" coordinate;
A end point 145 will be identified by first white bits;
A cross point 144 will be identified by coordinate value which belong to two or more lines;
A reverse read start from end of the line reading;
A start read point 143 if not an end point for reading continuation until all lines will be read or until the read information will be required to identify a complete part of the data;
A location for a complete part of the data characterized by the start read point location;

FIG. 18—discloses an example of a pattern of overlap matching recognizer of the data.

The data identification by overlap matching will be performed by the simultaneous writing of data over all recognized standards of data by real data time writing and reading to find an overlap match degree of coincidence of them.

The match operation can be analog or digital and will be performed in video buffer (subsystem 2), computer registries or read and write memory.

The data and the recognize standard can be constituted in bit values 1 or 0 and by color (chromo) bit values, by lines means (thin (the width values will be compressed to one bits values (1 or 0), real width of the lines), by points means (one point value 1 or 0 or one point value color (chromo), by read (write) scanning and return flag values of the cursor (read, written devices).

The overlao recognition read (write) processes can be performed into analog hold and delay techniques, by video camera reading from the screen the overlap matched between the data and the standard and by exist analog storage (magnet, etc.).

I claim:
1. A video computer system comprising:
a video camera for inputting image data;
a microphone for inputting audio data;
a keyboard for inputting typed data;
means for inputting handwritten data;
a speaker for outputting processed data;
a printer for outputting processed data;
an image display for displaying data to be analyzed and processed data;
analog and digital computer drive means for driving analog and digital components;
analog to digital conversion means for converting analog signals to digital signals;
digital to analog conversion means for converting digital signals to analog signals;

memory means for storing input data in respective dictionary files, where the dictionary files comprise image data file a handwritten data file, a musical note file, a mathematical algorithm file and a speech data file;

analog computer processing means for converting input data signals to digital data signals using the analog-to-digital conversion means;

said analog computer processing means also performing arithmetical computations on the analog data using arithmetic logic unit, computing logical operations by using a logic control unit, and filtering the input data signals;

digital computer processing means having machine language instructions utilized for transmitting command signals, transfer signals and processing signals by way of bus means to the video camera, the microphone, the keyboard, the handwriting input means, the speaker, the printer, the image display, analog and digital computer drive means and various processing means;

interfacing means for coupling by way of busing means the analog computer processing means with the video camera, the microphone, the keyboard, the handwriting input means, the speaker, the printer, the image display means and the analog and digital computer drive means, and for coupling by way of busing means the digital computer processing means with the video camera, the microphone, the keyboard, the handwriting input means, the speaker, the printer, the image display means and the analog and digital computer drive means, wherein the analog computer processing means has interfacing means coupled to the interfacing means of the digital computer processing means;

the video computer system further comprises various processing means;

handwriting processing means for recognizing handwritten data by comparing, utilizing comparison means, the inputted handwritten data with the contents of the handwritten data file, wherein the comparison means compares both letters and words of the inputted handwritten data, in order to recognize, using recognition means, those which closely match letters and words stored in the handwritten data file;

character recognition processing means for recognizing printed characters using coordinate computing means to compute coordinates of a character, organizing the coordinates into a matrix form using matrix recognizing means and comparing the matrix form of the character to the contents of the image data file using comparison means;

dictation processing means for recognizing audio data which has been inputted through the microphone means wherein the audio data is compared, using comparison means, to the contents of the speech data file in the case where the audio data is dictated, and to the contents of the musical note file in the case where the audio data is musical data, and outputting to the printer and or speaker the recognized audio data;

recitation processing means for recognizing typed data by comparing, using comparison means, typed data which has been inputted through the keyboard to the contents of the image data file and the musical note dile;

model drawing processing means for recognizing models of objects, where the models of objects are recognized by first obtaining coordinate values, using coordinate value calculating means, to thereby obtain a three dimensional representation of the models of objects, then storing said coordinate values and computing line widths, dimensions, outlines and shades utilizing line width calculating means, dimension calculating means, outline calculating means and shade calculating means, whereby the models of objects which have been processed are stored in the image data file;

drawing processing means for digiting drawings using digitizing means, displaying the digitized drawing on the image display means and then editing the displayed drawing utilizing the keyboard in order to select, add and delete portions of the drawings by using the image data file;

analog and digital processing means for controlling the analog and digital computer drive means, for binarizing data using analog to digital conversion means, for formatting the binarized data by using formatting means and for selectively storing the data in the memory means;

identification processing means for identifying data which has been inputted into the video computer system and labelling the identified data into a corresponding keyboard key value;

identification by parts processing means for retrieving data from the image data file and identifying parts of the image based on certain keyboard commands entered through the keyboard, wherein overlapping parts of the image are sorted by sorting means and recognized by an overlapping processing means;

color processing means for separating color bits by a color bit separating means, identifying the color by using color identifying means and grouping similar color data by using a color grouping means;

measurement processing means for obtaining contrast of data inputted to the video computer system by using contrast means, obtaining distances and dimensions using distance measuring means and dimension measuring means, and for calibrating obtained data by using calibrating means;

moving processing means for positioning an image retrieved from the image data file by using positioning means, translating the image using translating means and using rotating means for rotating an image; and speech recognition means for recognizing audio data which has been inputted by the microphone and music processing means for analyzing data which has been inputted by the keyboard and microphone and outputting the analyzed data to the speaker.

* * * * *